United States Patent
Forchheimer et al.

(10) Patent No.: US 10,078,904 B2
(45) Date of Patent: Sep. 18, 2018

(54) IMPACT TIME FROM IMAGE SENSING

(75) Inventors: Robert Forchheimer, Linköping (SE); Anders Aström, Linköping (SE)

(73) Assignee: SICK IVP AB, Linkoping (SE)

( * ) Notice: Subject to any disclaimer, the term of this patent is extended or adjusted under 35 U.S.C. 154(b) by 1023 days.

(21) Appl. No.: 14/373,306

(22) PCT Filed: Jan. 20, 2012

(86) PCT No.: PCT/EP2012/050905
§ 371 (c)(1),
(2), (4) Date: Oct. 22, 2014

(87) PCT Pub. No.: WO2013/107525
PCT Pub. Date: Jul. 25, 2013

(65) Prior Publication Data
US 2015/0035990 A1    Feb. 5, 2015

(51) Int. Cl.
*G06T 7/246* (2017.01)
*G06T 7/579* (2017.01)

(52) U.S. Cl.
CPC .............. *G06T 7/246* (2017.01); *G06T 7/579* (2017.01); *G06T 2200/28* (2013.01); *G06T 2207/30261* (2013.01)

(58) Field of Classification Search
CPC combination set(s) only.
See application file for complete search history.

(56) References Cited

U.S. PATENT DOCUMENTS

| 4,216,538 A | 8/1980 | Healy et al. |
| 4,652,121 A | 3/1987 | Ito et al. |
| 6,650,774 B1 * | 11/2003 | Szeliski ................. G06T 5/008 348/225.1 |

(Continued)

FOREIGN PATENT DOCUMENTS

| DE | 10 2004 046101 | 9/2006 |
| EP | 1 426 732 | 6/2004 |

(Continued)

OTHER PUBLICATIONS

International Search Report in International Application No. PCT/EP2012/050905, dated Jun. 12, 2012, 7 pages.

(Continued)

*Primary Examiner* — Dave Czekaj
*Assistant Examiner* — Tyler W. Sullivan
(74) *Attorney, Agent, or Firm* — Fish & Richardson P.C.

(57) ABSTRACT

Impact time between an image sensing circuitry and an object relatively moving at least partially towards, or away from, the image sensing circuitry can be computed. Image data associated with a respective image frame of a sequence (1 . . . N) of image frames sensed by said image sensing circuitry and which image frames are imaging said object can be received. For each one (i) of multiple pixel positions, a respective duration value (f(i)) indicative of a largest duration of consecutively occurring local extreme points in said sequence (1 . . . N) of image frames can be computed. A local extreme point is present in a pixel position (i) when an image data value of the pixel position (i) is a maxima or minima in relation to image data values of those pixel positions that are closest neighbors to said pixel position (i).

23 Claims, 23 Drawing Sheets

(56) References Cited

U.S. PATENT DOCUMENTS

| | | | | |
|---|---|---|---|---|
| 6,711,293 | B1* | 3/2004 | Lowe | G06K 9/4671 |
| | | | | 382/219 |
| 2007/0154068 | A1* | 7/2007 | Stein | G01C 3/22 |
| | | | | 382/106 |
| 2007/0242872 | A1* | 10/2007 | Rudin | G06K 9/00664 |
| | | | | 382/154 |
| 2008/0046181 | A1* | 2/2008 | Koike | G06T 7/269 |
| | | | | 701/301 |
| 2010/0085427 | A1* | 4/2010 | Cheng | G06T 7/246 |
| | | | | 348/118 |
| 2011/0090371 | A1* | 4/2011 | Cote | H04N 5/2176 |
| | | | | 348/237 |
| 2012/0219211 | A1* | 8/2012 | Ding | G06K 9/4642 |
| | | | | 382/159 |

FOREIGN PATENT DOCUMENTS

| | | |
|---|---|---|
| EP | 1 640 937 | 3/2006 |
| JP | 2008/186375 | 8/2008 |
| WO | WO 2005/006073 | 1/2005 |

OTHER PUBLICATIONS

International Search Report in International Application No. PCT/EP2012/050905, dated May 19, 2014, 7 pages.

Written Opinion in International Application No. PCT/EP2012/050905, dated Jun. 12, 2012, 13 pages.

Astom et al., "Global Feature Extraction Operations for Near-Sensor Image Processing," *IEEE Trans Image Processing*, 1996, 5(1):102-110.

Forchheimer et al., "Near-sensor Image Processing: A New Paradigm," *IEEE Transactions on Image Processing*, Nov. 1994, 3(6):736-746.

Nebot et al., "Cooperative Navigation using the Optical Flow and Time-to-contact Techniques," $10^{th}$ *Int. Conf. on Control, Automation, Robotics and Vision*, Dec. 2008, 1736-1741.

Nelson, "Using Flow Field Divergence for Obstacle Avoidance: Towards Qualitative Vision," *IEEE*, Dec. 1988, 188-196.

Ruedi, "Motion detection silicon retina based on event correlations," *Microelectronics for Neural Networks: Proceedings of fifth International Conference*, Feb. 1996, 23-29.

Tetsushi et al., "A Method to Recognize 3 D Shapes of Moving Targets Based on Integration of Inclined 2D Range Scans," *IEEE Int. Conf on Robotics and Automation*, May 2011, 3575-3580.

Zhao et al., "Joint Tracking and Classification of Moving Objects at Intersection Using a Single-row Laser Range Scanner," *Proceedings of the IEEE ITSC*, Sep. 2006, 287-294.

International Preliminary Report on Patentability in International Application No. PCT/EP2012/050905, dated May 19, 2014, 15 pages.

Cipolla and Blake, "Image Divergence and Deformation from Closed Curves," The International Journal of Robotics Research, Feb. 1997, 16(1):77-96.

\* cited by examiner

IMPACT TIME FROM IMAGE SENSING

CROSS-REFERENCE TO RELATED APPLICATION

This application is a National Stage application under 35 U.S.C. § 371 of International Application No. PCT/EP2012/050905, having an International Filing Date of Jan. 20, 2012.

TECHNICAL FIELD

Embodiments herein relate to a method and an apparatus. In particular, embodiments herein relate to how time to, or from, impact can be computed between an image sensing circuitry and an object relatively moving at least partially towards, or away from, the image sensing circuitry.

BACKGROUND

All conventional state-of-the-art methods at hand for computing impact time based on image sensing require complex computations and handling of large amounts of data, and therefore also requires complex hardware, at least in order to be able to compute time-to-impact at sufficient speed for many applications. This makes the conventional methods expensive and often not cost efficient enough to implement and use in many situations.

SUMMARY

It is therefore an object of embodiments herein to enable impact time computations that can be realized more cost efficiently than existing state-of-the-art solutions, but still at comparative speeds.

According to a first aspect, the object is achieved by a method as claimed in claim 1. According to a second aspect, the object is achieved by an apparatus as claimed in claim 14.

The computed duration value f(i), such as number of frames, for an individual image point i will be a measure of how static the imaged scenery was in this image point throughout the sequence. Since the relatively moving object is imaged by the sequence of image frames, it can thus be expected to be large duration value in static object parts, for example corresponding to the focus of expansion in the image, and smaller duration values in image points farther away from the focus of expansion. It has been shown that information on impact time is encoded in the duration values and that this can be used for computing impact time. The computed duration values may be stored in a array or matrix with positions corresponding to the image positions, where each position stores one duration value, for example something as simple as an integer count value which may be only a few bits long. Hence, compared to conventional methods for impact time computation based on optical flow sensing, a heavily reduced amount of data is accomplished, and can be computed by comparatively simple operations, where the reduced data still contains information of interest and that can be used for computing impact time.

It is also realized, owing to that operations is performed on image positions independent and that the local extreme points only relate to local data, that the computations can be made in parallel and therefore is well suited to be implemented on such hardware architectures, for example SIMD (Single Instruction Multiple Data) type of processors. Is also understood that embodiments herein therefore are particularly well suited to be implemented on parallel architectures with processing capacity directly on or in close connection with the images sensing circuitry, or even in close connection with single sensing elements, for example on an NSIP (Near Sensor Image Processing) type of processor or FPA (Focal Plane Array) type of image processor, which have relatively low overall complexity and therefore can be provided at lower cost compared to more complex state-of-the-art solutions. It has further shown that embodiments herein still enable provision of time-to-impact data and subsequent computing of time-to-impact using that data, at speeds that are competing favorably with the state-of-the art solutions.

BRIEF DESCRIPTION OF THE DRAWINGS

Examples of embodiments herein are described in more detail with reference to the appended schematic drawings, in which.

DESCRIPTION

Figure 1:
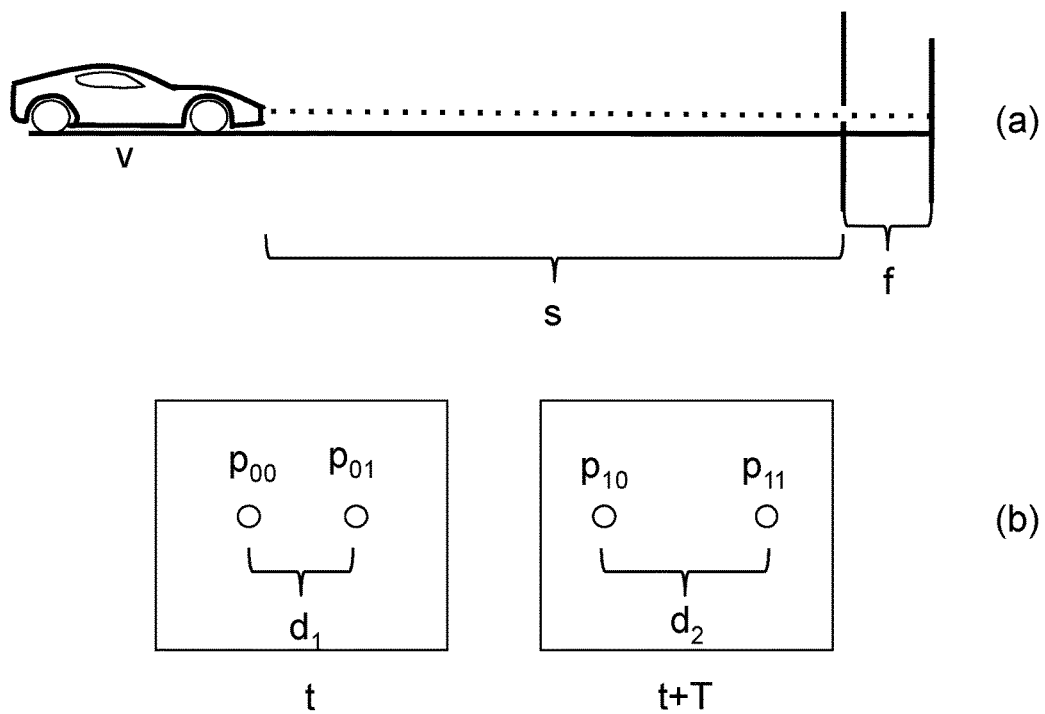
FIGS. 1-34 are schematic drawings.
Figure 2:
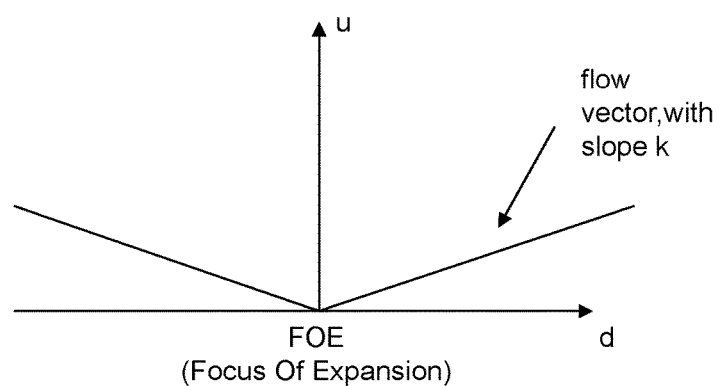

As part of the development towards embodiments herein, the problem indicated in the background section will first be further discussed, with reference to FIGS. 1 and 2.

FIG. 1(a) illustrates a (night) view of a car with its headlights moving towards a sensor. FIG. 1(b) shows two images taken at T second interval. Even though the absolute distances between the headlights and to the car are not known, impact time can still be estimated as will be seen later. So, motion estimation of the image parts is of interest. In the example the headlights are easily recognizable features. Normally however, scenes are more complex and conventional feature-based techniques would include solving the correspondence problem, namely to pair a number of features found in two or more images. This can be eliminated by performing dense measurements both spatially and temporally by optical flow. Using images which are close in time, dt, and assuming high image resolution so that image data is 'differentiable' one can use the Optical Flow Equation, which simply assumes that an image feature that moves a distance (dx,dy) during the time dt will not change its intensity I, resulting in $$u\frac{\partial I}{\partial x} + v\frac{\partial I}{\partial y} + \frac{\partial I}{\partial t} = 0, \quad (1.)$$

where $$u = \frac{dx}{dt} \quad (2.)$$

and $$v = \frac{dy}{dt} \quad (3.)$$

are the motion components horizontally and vertically in the image plane. To compute these motion components, a.k.a. the flow vector, one needs to consider a feature area of at least two pixels. The optical flow field gives a lot of information (essentially one motion vector per pixel), which is not necessary for the case where most of the motion is considered to be ego-motion, the name given to the type of motion generated by the camera moving in a static scene. The motion of a non-rotating object in 3-D space can be specified with only 6 parameters, so all the motion data can be collapsed into such a 6-parameter set. In fact, due to the unknown scale factor, only 5 parameters can be estimated assuming some specific value for the last one.

The optical flow field has a strong internal structure which relates to the ego-motion parameters. For example, there will be a "focus-of-expansion" point (FOE) in the flow field which corresponds to the impact point (i.e. the position where the impact will occur) in the scene. The size of the flow vectors centered around FOE are related to the ego-motion parameters in a simple way. For instance, when the camera is looking at the same direction as the motion, i.e. the line-of-sight is parallel to the motion vector (frontal view), there will be a vector field that will be zero at the focus-of-expansion point increasing linearly (in the ideal case) with different signs towards the edges of the image, see FIG. 2 for the length of the flow vectors along a line in the image. The slopes of these lines are ±k and the function be written as $$u = |k \cdot d| \quad (4.),$$

where d is the distance between a point and the FOE. However, it is not possible to calculate the absolute speed difference between the camera and the object from the optical flow. The reason is that one cannot distinguish between the case where the camera moves slowly toward a wall in a room and the case where a fighter plane is moving toward a mountain at supersonic speed. However, the time-to-impact can still be computed. This can be understood if we return to the car example. The car moves towards the camera at a constant speed v, see FIG. 1(a). The distance between the headlights is assumed to be D. From the two pictures of the car taken at a time interval of T, see FIG. 1(b), we get the following relations:

$$p_{00} - p_{01} = d_1 = \frac{Df}{S} \quad (5.)$$

$$p_{10} - p_{11} = d_2 = \frac{Df}{S - vT} \quad (6.)$$

where d1 and d2 are the distances between the headlights in the projected images, f is the focal length of the (pinhole) camera of the sensor and S is the distance to the car in the first image.

The time to impact is then found to be, $$T_I = \frac{S}{v} = T\left(1 - \frac{d_1}{d_2}\right)^{-1} \quad (7.)$$

We know that the motion in the image is proportional to the distance from the FOE. Given that the headlights positions in the images are symmetrical around the FOV the difference in position of the headlights in the two images can also be expressed as $$p_{1,x} - p_{0,x} = k \cdot p_{0,x} \quad (8.)$$

so that $$d_2 = p_{10} - p_{11} = p_{00}(1+k) - p_{01}(1+k) = d_1(1+k) \quad (9.),$$

which means that $$\frac{d_1}{d_2} = \frac{1}{(1+k)} \quad (10.)$$

and $$T_I = T\left(1 - \frac{d_1}{d_2}\right)^{-1} = T\frac{1+k}{k} \quad (11.)$$

The time to impact is therefore the time interval between the exposures, T, multiplied by a factor that only includes the slope k. This is of course not only valid for the car example but also for all situations where there are scene points moving towards or away from the sensor.

Embodiments herein for enabling to compute impact time between an image sensing circuitry and an object relatively moving at least partially towards, or away from, the image sensing circuitry, will now be described with reference to the flowchart depicted in FIG. 3. After this a different, more specific and detailed embodiment will be described and results evaluated, to further explain and enhance understanding of embodiments herein and benefits thereof.

Action 301

In this action, it is received image data associated with a respective image frame of a sequence of image frames sensed by the image sensing circuitry and which image frames are imaging said object.

Hence, there will be a sequence of images imaging the object causing change in the images owing to the relative movement. The object will be moving either in an away or approaching direction. If approaching the impact time is a time-to-impact. If moving away, the impact time is a time from impact. By relatively moving is meant that it may be the image sensing circuitry that is moving and the object is standing still or moving as well, or that the image circuitry is standing still and the object is moving.

The image frames of the sequence may be received one by one as soon as they are sampled by the image sensing circuitry or may be received as a group or groups of image frames. The image frames, individually, in groups or whole sequence, may be received directly, or as soon as possible, after they have been captured or sampled, for real-time applications.

Action 302

In this action, it is computed, for each one of multiple image positions, a respective duration value indicative of a largest duration of consecutively occurring local extreme points in the sequence of image frames.

A Local Extreme Point, LEP, is present in an image position when an image data value of that image position is a maxima and/or minima value in relation to values of corresponding image data of all, or at least two, pixel positions that are adjacent to the image position. Hence, two adjacent pixels can never be LEPs in the same frame. In a 1-dimensional image frame, a LEP in an image position will determined in relation to its two adjacent, i.e. closest neighbour, pixel positions. In a 2-dimensional image frame, a LEP in an image position will typically be considered in relation to its four or eight adjacent pixel positions. An example of an image data value is an intensity value, but also other kind of image data may be used depending what is considered to be best in a given situation in view of e.g. what image sensing circuitry is being used, noise conditions, what kind of object is to be captured in what environment, light conditions, etc. A LEP is typically determined based on image data from only the image frame of the LEP.

A pixel is defined as the smallest picture element in each image frame. Each image frame is formed of pixels, each pixel being associated with a pixel position. Hence, in different image frames of the sequence there may be different image data in the same pixel position. Since the object is relatively moving, it is expected that image data in certain pixel positions will change between image frames.

An image position typically corresponds to a pixel position. Herein image position generally refers to an image position being part of said multiple image positions. How the multiple image positions may relate to the pixel positions of each image frame, is discussed separately below. To facilitate understanding it may in the following, when nothing else is stated, be assumed that there is correspondence between image position and pixel position and that said multiple image positions are synonymous with all pixel positions in each image frame, although this may not be the case in all embodiments.

How many image frames that may be part of the sequence, and what may affect how many to select to be part thereof, is also discussed separately below.

Hence, in other word, in this action it is checked per image position of the multiple image position, which image positions thus are the same in every image frame of the sequence, how many LEPs that follows consecutively, i.e. that follow directly after each other, in the sequence and the longest duration of such "max consecutive LEP sequence" is computed. There will thus be one duration value indicative of the longest duration computed for every image position. Note that if no LEP is found the duration is 0, and the handling of this case is further discussed below.

For finding consecutively occurring LEPs, it can be understood that these first should be identified and then counted, where the identification involve some comparison with image data of adjacent pixel positions. From the above explanation of LEP, it is readily understood that the identification as well as the counting can be done in numerous different ways by utilizing well known operations, but that what operation or operations to use may depend on the implementation, e.g. what hardware will be executing this action. It is well within the capacity of the skilled person to select suitable operation to execute this step. A specific example on a particular hardware will be given below in connection with the mentioned detailed embodiment. However, in general all processors that are able to process images, such as on an ordinary computer, can easily be programmed to execute this step as well.

The duration value may be a largest number of consecutively occurring local extreme points in said sequence, which corresponds to a duration since the LEPs subject to the duration are in consecutive image frames. Another example of a duration value is a time value. However, since the frames typically are captured, or sensed, at a known sample rate, it may be convenient or more efficient to count and use number of frames as the duration value. However, if every image frame is associated with a time stamp, a difference in time stamps between first and last image frame of a "max consecutive LEP sequence" could be used as a duration value instead.

Figure 4:
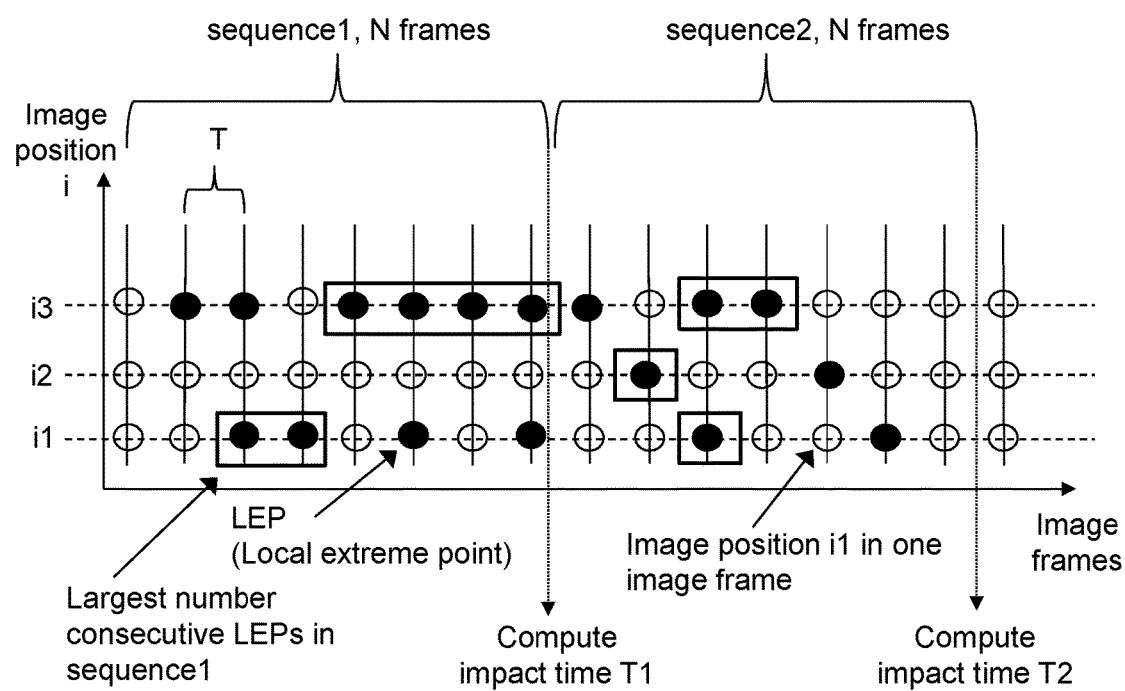

To enhance understanding the schematic FIG. 4 may be consulted, showing two sequences, sequence1 and sequence2, of image frames. Each vertical line corresponds to an image frame and each horizontal line to an image position that thus is the same for the image frames in each sequence. Three image positions i1, i2 and i3 are shown. At the crossing between image positions and image frames a circle has been plotted, thus representing an image position in an individual image frame. Circles that are filled (black) represent such positions where a LEP is present and unfilled (transparent) circles are positions with no LEP. It can be noted, assuming that the image positions i1, i2 and i3 corresponds to adjacent pixel positions, that there cannot be LEPs in adjacent pixel positions in the same frame. The largest duration value (here largest number of image frames) that represents the largest duration of consecutively occurring LEPs in each one of sequence 1 and sequence 2 has been marked by a black square. Hence, in sequence1 comprising 8 image frames the duration value is 2 frames for image position i1, 0 frames for image position i2 and 4 frames for image position i3.

It can be understood that the computed duration value $f(i)$, such as number of frames, for an individual image point i will be a measure of how static the imaged scenery was in this image point throughout the sequence. Since the relatively moving object was imaged by the sequence of image frames, it can thus be expected to be large duration values in static object parts, for example corresponding to the focus of expansion in the image, and smaller duration values in image points farther away from the focus of expansion. It will be shown below how this mathematically can be utilized and that information on impact time can be extracted from the duration values.

It can further be understood that the computed duration values may be stored in a array or matrix with positions corresponding to the image positions, where each position stores one duration value, for example something as simple as an integer count value which may be only a few bits long. Hence, compared to conventional methods for impact time calculation based on optical flow sensing, a heavily reduced amount of data has been accomplished, and can be calculated by comparatively simple operations, where the reduced data still contains information of interest and that can be used for computing impact time.

It is also realized, owing to that operations are performed on image positions independent, and that the LEPs only relate to local data, that the computations can be made in parallel and therefore are well suited to be implemented on such hardware architectures, for example SIMD (Single Instruction Multiple Data) type of processors. Is also understood that embodiments herein therefore also are particularly well suited to be implemented on parallel architectures with processing capacity directly on or in close connection with the images sensing circuitry, or even in close connection with single sensing elements, for example on an NSIP (Near Sensor Image Processing) type of processor or FPA (Focal Plane Array) type of image processor. Architectures on which embodiment herein may be implemented will be further discussed below, and a detailed example of an implementation on an NSIP type of processor will be given.

The computed durations values may be output for further processing, extracting and/or utilizing the information encoded therein, or it may optionally be further processed according to embodiments herein as described for actions below.

Action 303

In this action, which is an optional action, a sum $\Sigma f(i)$ of the computed duration values $f(i)$ is computed. It will be shown below that this sum alone may encode information of interest and that it can be used to compute impact time. The sum represents an even more compressed data set and this is also accomplished by a simple operation. Typically such parallel architectures as discussed in the foregoing offer the possibility to sum results from respective parallel processing elements.

In some embodiments, before computing the sum, any computed duration value that is zero may be replaced with a non-zero duration value from a neighbouring image position. Reason for this will be explained in connection with the detailed embodiment below.

The computed sum may be output for further processing, extracting and/or utilizing the information encoded therein, or it may optionally be further processed according to embodiments herein as described for actions below.

Action 304

In this action, which is an optional action, a slope value k is computed based on an inverse of the sum $\Sigma f(i)$ multiplied with a scale factor c. Said slope value k corresponds to:

$$k = \frac{c}{\Sigma f(i)},$$

where c is said scale factor and $\Sigma f(i)$ is said sum of the duration values f(i).

In some embodiments the scale factor c correspond to:

$$c = \Sigma \frac{1}{|i|},$$

where i is a respective image position of said multiple image positions. In some embodiments, for instance if the density of valid (non-zero) duration values is low, the slope value k can instead be calculated by fitting a line of the f(i) values as a function of i directly and where k is given by the slope of this line.

This c is typically used for computing k when there is a frontal view of the object, that is, when the object is moving straight towards or away from the image sensing circuitry imaging the object.

The computed slope value k may be output for further processing, extracting and/or utilizing the information encoded therein, or it may optionally be further processed according to embodiments herein as described for actions below.

Action 305

Figure 16:
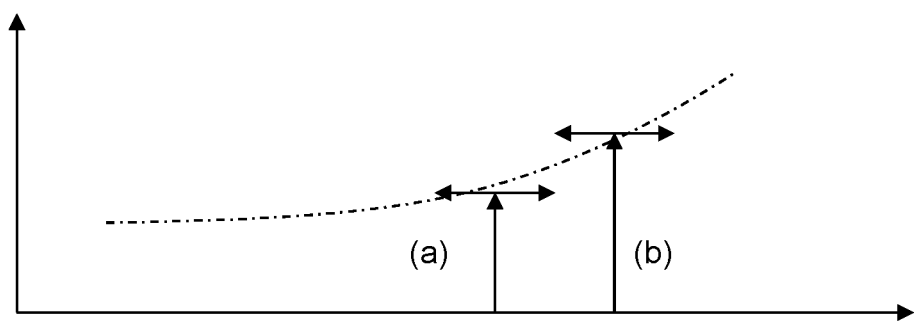

In this action, which is an optional action, it is computed an offset value δ indicative of an offset of an image position $i_{max}$ of a maximum duration value amongst the computed largest duration values f(i) in relation to a centre image position $i_{centre}$ of said multiple image positions. (An example of the offset is shown in FIG. 16, which is further referred to below.) The offset is then used in some embodiments to determine the scale factor c, where scale factor c corresponds to:

$$c = \Sigma \frac{1}{|(i - \delta)|},$$

where i is a respective image position of said multiple image positions and δ is said offset value.

A c taking into account the offset as above is typically used for computing k when there is a non-frontal view of the object, that is, when the object is moving partially towards or partially away from the image sensing circuitry imaging the object. Or phrased differently, when the image sensing circuitry is looking in a different angle than the direction of the relative movement.

From the different ways of computing c presented above under Action 304 and 305, it can be concluded that if the relative moving direction is predetermined, the scale factor c may be predetermined as well and considered to be constant both for frontal and non-frontal view, independent on what the duration values and sum compute to. For a given sensor and knowledge of the multiple image positions to be used, which may correspond to all pixel positions of the sensor, c can be predetermined and used as constant when computing k. In such situations, the sum as such may be used as a sufficient measure since it may be learned what meaning different computed sums may have in terms of impact time without needing to actually compute the impact time explicitly.

Correspondingly, even if the relative moving direction is not known in advance and c is computed by first computing the offset from the computed duration values as discussed under Action 305 above, the k value as such may be used a sufficient measure since it may be learned what meaning different k values may have in terms of impact time without needing to actually compute the impact time explicitly.

Action 306

In this action, which is an optional action, the impact time is computed using the computed slope value k, wherein the impact time $T_I$ corresponds to:

$$T_I = T\frac{1 + k}{k},$$

where k is the computed slope value and T is the sample period of the image frames. The sample period correspond to the time period T between consecutive image frames in the sequence, as e.g. is indicated in FIG. 4. This equation corresponds to equation (11) above.

The computed impact time Ti may be output for further use in different applications, some of which are mentioned below.

Figure 5:
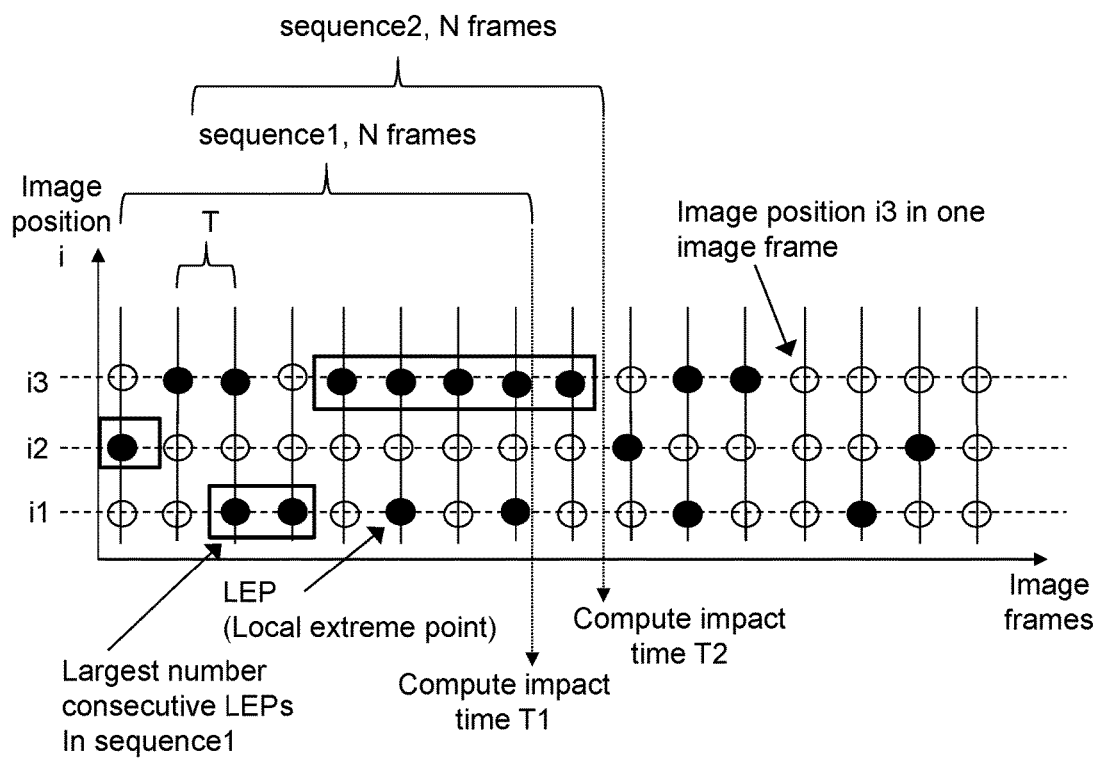

Refer now to FIG. 5 showing another example of how different sequences of image frames may relate to each other, compared to what was shown in FIG. 4, discussed above under Action 302.

As in FIG. 4, each vertical line corresponds to an image frame and each horizontal line to an image position that thus is the same for the image frames in each sequence. Three image positions i1, i2 and i3 are shown. At the crossing between image positions and image frames a circle has been plotted, thus representing an image position in an individual image frame. Circles that are filled (black) represent such positions where a LEP is present and unfilled (transparent) circles are positions with no LEP. It can be noted, assuming that the image positions i1, i2 and i3 corresponds to adjacent pixel positions, that there cannot be LEPs in adjacent pixel positions in the same image frame. In FIG. 4, the sequence1 of N frames is first used for computations according to the Actions discussed in connection with FIG. 3 above, resulting in a first impact time T1. Then the image frames of sequence1 are dismissed and instead a sequence2 of N frames following sequence1 are used for new computations according to the Actions discussed in connection with FIG. 3 above, resulting in a second impact time T2.

In FIG. 5, sequence2 is instead based on the previous sequence1, by adding a new image frame and removing the oldest image frame. That is, the image frames of the sequence are determined by a window of N frames length that move one image frame at a time. This way new information is added for each frame and may result in new computations according to the Actions discussed in connection with FIG. 3 above. For example, as illustrated in FIG.

5, a new computed impact time T2 may follow a previously computed impact time T1 only one image frame sample period T later.

The largest duration value (here largest number of image frames) that represents the largest duration of consecutively occurring LEPs in sequence 2 has been marked by a black square e.g. for comparison with sequence2 of FIG. 4. Another example with reference to FIG. 5: An duration value array for image positions [i1,i2,i3] for sequence1 is [2,1,4] and for sequence2 [2,0,5].

How many image frames N, that is samples, to select to be part of a sequence may vary from case to case. In a given situation, in view of requirements and knowledge of the hardware for implementation, expected movement and type of object etc, the skilled person will be able to select and/or by using routine testing, to find a suitable number of samples to use in each sequence. In some embodiments a constant number may be used, in other embodiments the number may be selected based on feedback from previous computations and/or from other sources of information. Some guidelines: If a previous impact computation or computations has/have indicated a that the object is close or that it is approaching fast, a lower number of samples may be used in order to provide a new computed values faster to the cost of lower accuracy. If a previous impact computation or computations has/have indicated a that the object is not close and/or that it is approaching slow, a higher number of samples may be used in order to increase accuracy.

Figure 6:
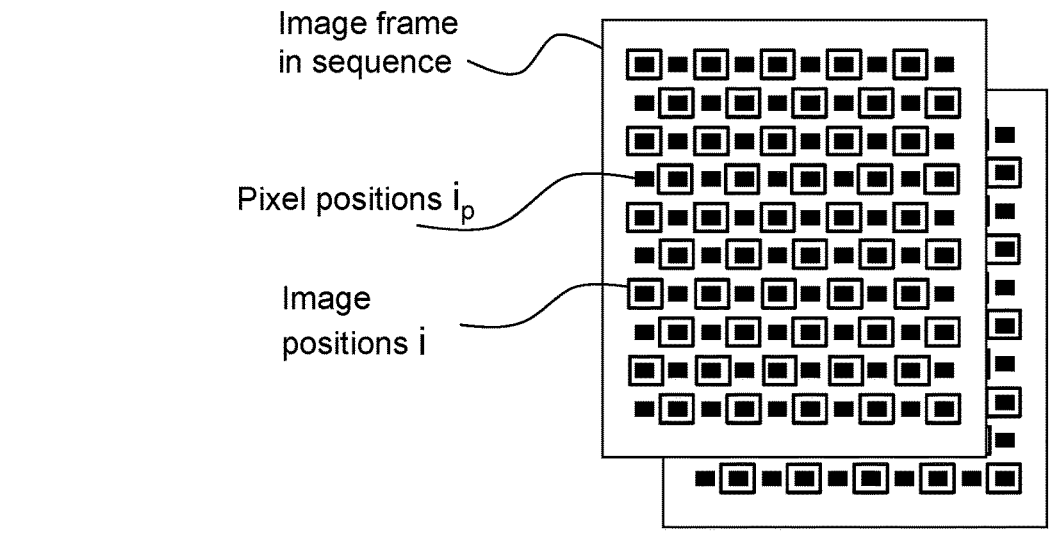
Figure 7:
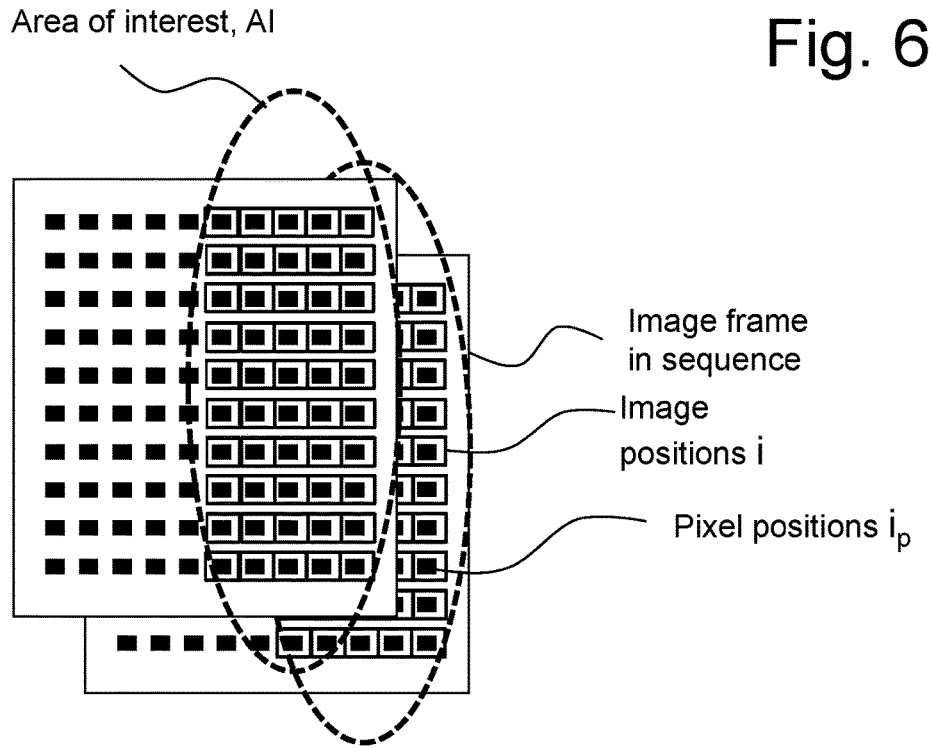

FIGS. 6 and 7 will now be used to further discuss how the multiple image positions may relate to pixel positions. The case when there is direct correspondence between the multiple image positions and pixel positions has already been mentioned.

In some embodiments the multiple image positions corresponds to a subset of all pixel positions. This is shown in the examples of both FIGS. 6 and 7. In FIG. 6 every second pixel position $i_p$ has been selected as an image position I to be part of the multiple positions for which duration values are computed as described in the foregoing. In some embodiments the multiple image positions i are uniformly distributed amongst all pixels positions $i_p$, or at least all pixel positions $i_p$ in an area of interest AI. Uniform distribution amongst all pixels are illustrated in FIG. 6 and uniform distribution in an area of interest is illustrated in FIG. 7. The shown area of interest corresponds to an divided field of view. An area of interest may be any subarea of the whole pixel area, typically an area where it is known that the object will move, or that is desirable to use for the computations for some reason. It is of course possible to select less than every second pixel position for the multiple image positions when these are a subset of all pixel positions.

Figure 8:
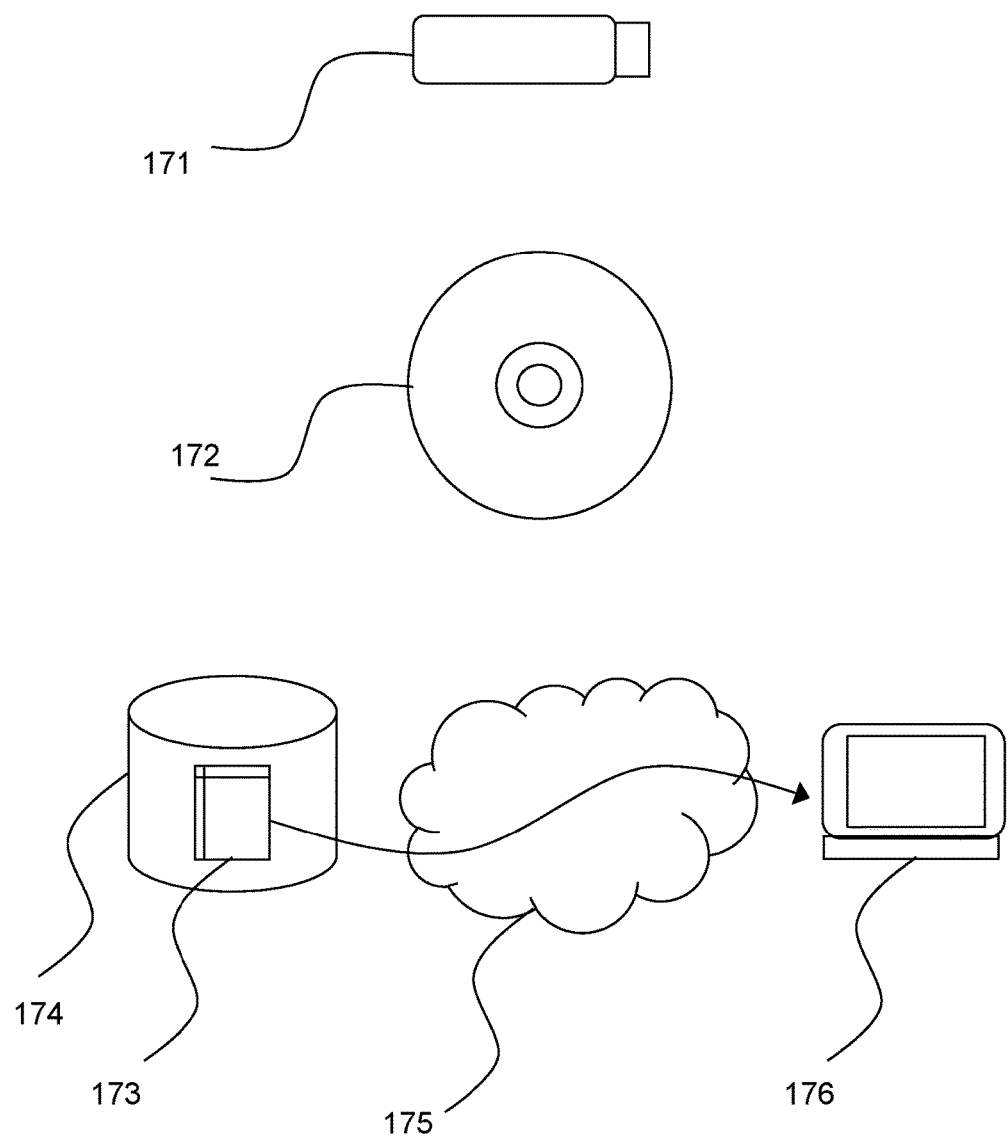

Refer now to FIG. 8. Embodiments herein as described above in connection with FIG. 3 and related Actions, may be implemented by a computer program product, loadable into the internal memory of a computer, comprising software for executing the Actions. For example may the computer program product be executable file 173 stored on a hard drive or other storage means 174 and may be retrievable therefrom via a network 175, such as the Internet, and downloaded to a computer 176, which may be the computer for the execution, or an intermediate computer for storage. The computer program product may also be stored in a memory stick 171 or a disc 172, such as CD or DVD, to mention some further examples. The memory stick 171 and the disc 172 are also examples of a computer readable medium, which have a program recorded thereon, where the program is arranged to make the computer execute Actions as discussed above in connection with FIG. 3.

A more specific and detailed embodiment will now be described and results evaluated, to further explain and enhance understanding of embodiments herein and benefits thereof.

Figure 9:
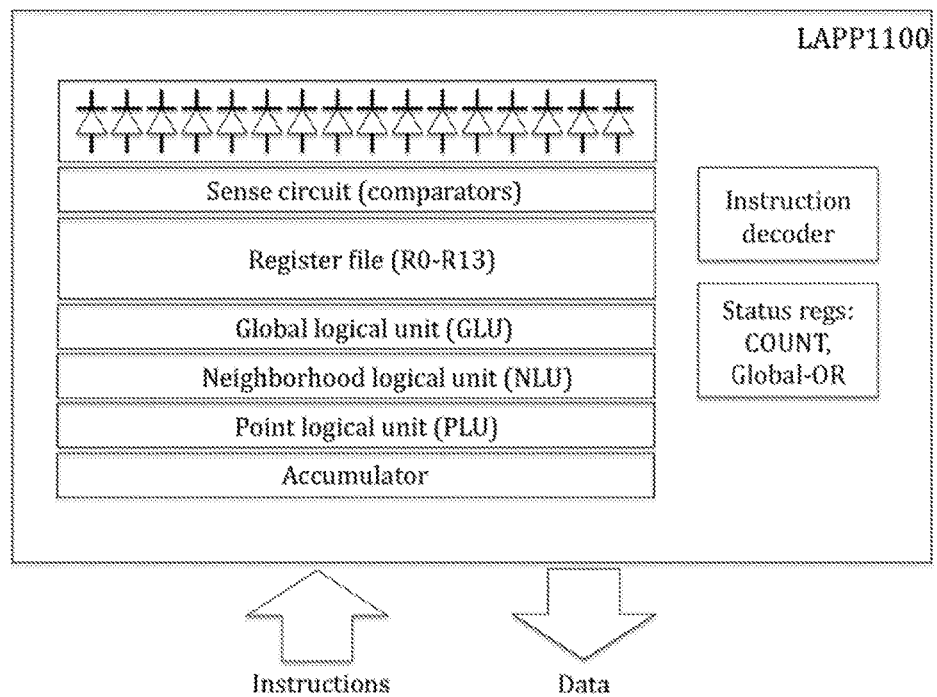

First the NSIP concept is (re)introduced since it will be used for the detailed embodiment. NSIP is a concept described for the first time almost 30 years ago, in which an optical sensor array and a specific low-level processing unit are tightly integrated into a hybrid analog-digital device. Despite its low overall complexity, numerous image processing operations can be performed at high speed competing favorably with state-of-art solutions. FIG. 9 shows the architecture of the first commercial implementation of the NSIP concept, the LAPP1100 chip. It consisted of 128 processor slices, one per pixel. Beside the light sensing circuitry, each slice contained a tiny arithmetic unit (Global Logic Unit or GLU, Neighborhood Logic Unit or NLU, Point Logic Unit or PLU ) and 14 bits of storage. Image data could be read-out from a shift register but also tested for the occurrences of one or more set bits (Global-OR) or the total number of set bits (COUNT) within the 128 bit line image. There was no A/D converter on board. Instead, if A/D conversion was part of an application it had to be implemented in software using one of several different principles. The simplest one was based on utilizing the approximately linear discharge that each CMOS photo diode exhibited during the exposure to light. A selected number of registers together with the arithmetic unit were then used to implement parallel counters that, for each pixel stopped counting when the photo diode reached a predefined level. Very early it was found that A/D conversion was often not necessary. Many tasks, such as filtering for certain features or performing adaptive thresholding could just as easily be done by utilizing the pixel readout circuit in combination with the small bit processor available at each pixel. These experiences were later summarized and published under the name of Near Sensor Image Processing (NSIP). A 2D-chip based on the same principles was built and shown to be able to process images at rates well above 100 000 frames per second. At the time, the largest practical resolution was 128*128 pixels using a 0.8 um CMOS process. Today, both higher pixel count as well as more complex circuitry in each pixel is viable. The LAPP1100 chip can further comprise an instruction decoder, accumulator, and sense circuit (comparators).

Figure 10:
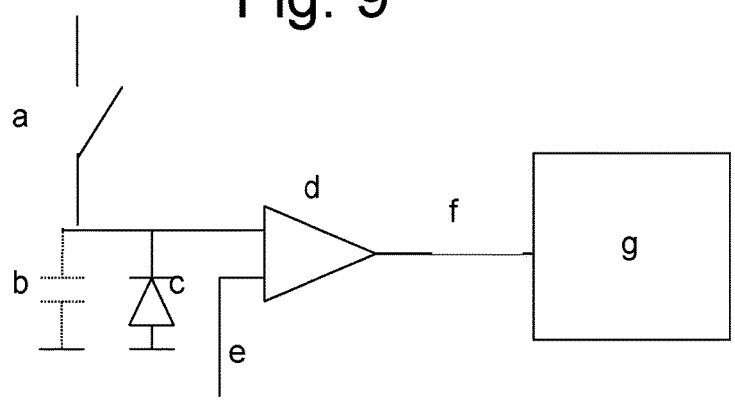
Figure 11:
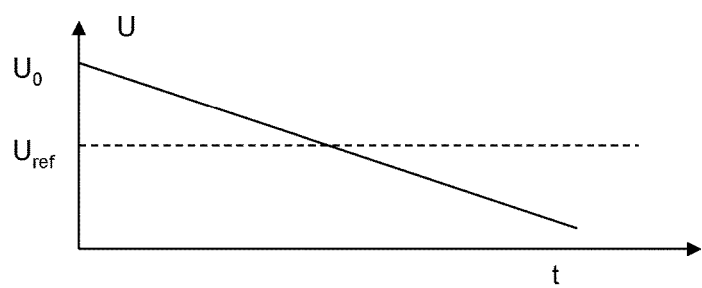

FIG. 10 shows the basic light sensing part. The capacitor (b) represents the inherent capacitance of the photo diode (c). When the switch (a) is on, the diode (c) precharges to its full value. As the switch is turned-off and the diode (c) discharge due to photo-induced current, the voltage on the input of the comparator (d) decreases. At some level, this voltage passes the reference voltage (e) and the output (f) switches its logical value. The output is then processed in the bit-serial arithmetic-logical unit (g). Many tasks, such as filtering for certain features, histogramming or doing adaptive thresholding can be performed by utilizing the pixel readout circuit in combination with the small bit processor available at each pixel. The concept naturally gives a high dynamic range as well as a very high frame rate.

When explaining the processor part of the NSIP architecture it is convenient to view it as a single processor with a word length N that is equal to the number of pixels in its sensor part. The main part of the processor is the register file containing register words of size N. A second important register is the accumulator, A. Although later implementations of NSIP contain additional registers to enhance certain types of processing, we will not take these under consideration for the purpose here. Simple operations are "point operations" such as AND, OR et cetera. They typically apply between a register, Ri, and the accumulator, modifying the accumulator to hold the new result. A very useful class of operations is the "local operations" in which a 3-element template is applied simultaneously over a register to form a low-level filtering operation. A 1-dimensional example of such an operation is the operation "(01x) R1" which compares the template (01x) against each position in the word and generates a logical 1 where the template fits and a logical 0 otherwise. This particular template checks that the bit position itself has the value 1 while its left neighbor is 0 and the right neighbor is allowed to be either 1 or 0 (i.e. "don't care"). This particular local operator is useful when it comes to finding edges in the intensity image and similar operations are as we will see later useful for finding LEPs.

The third class of operations is the global operations. These are used for many different purposes such as to find the leftmost or rightmost 1 in a register or to zero all bits from a certain position or to set a group of consecutive zero bits. The global operations are all derived from the mark operation which uses two input registers as operands. Set bits in the first register are viewed as pointers to objects in the second register. Objects are connected sets of 1's. Objects which are pointed to, will be kept and forwarded to the result.

With the above-mentioned operations at hand, one can implement most of the conventional low-level image processing tasks. Instructions are issued one at a time from an external or chip-internal sequencer or microprocessor over (typically) a 16 bit bus. Processed images can be read-out over the same bus, However, most often it is sufficient to compute some specific scalar value such as the position of an image feature, the highest intensity value, a first order moment et cetera). For this reason, the NSIP architecture also contains the count status, COUNT, which will always reflect the number of set bits in the accumulator as well as a global-OR which indicates if one or more bits in a register is set. Thanks to the status information, the majority of applications using NSIP will not need to read out images from the chip, thus speeding up the applications considerably. As an example the sum of all values f(i), each represented by b bits in the processors can be found using only b COUNT operations and appropriate scaling and summation of the COUNT results.

When implementing embodiments herein on the NSIP architecture introduced above, LEPs are first extracted in this specific embodiment. One of the simplest operations to extract LEP is to find local minima in a 3×1 neighborhood. This means that if the center pixel has a lower intensity compared to both its neighbors, then this pixel is a LEP. Since we are using the NSIP concept, we will have a high dynamic range which will find local minimum values in both bright and dark regions. This is one of the basic NSIP operations as discussed above.

Figure 12:
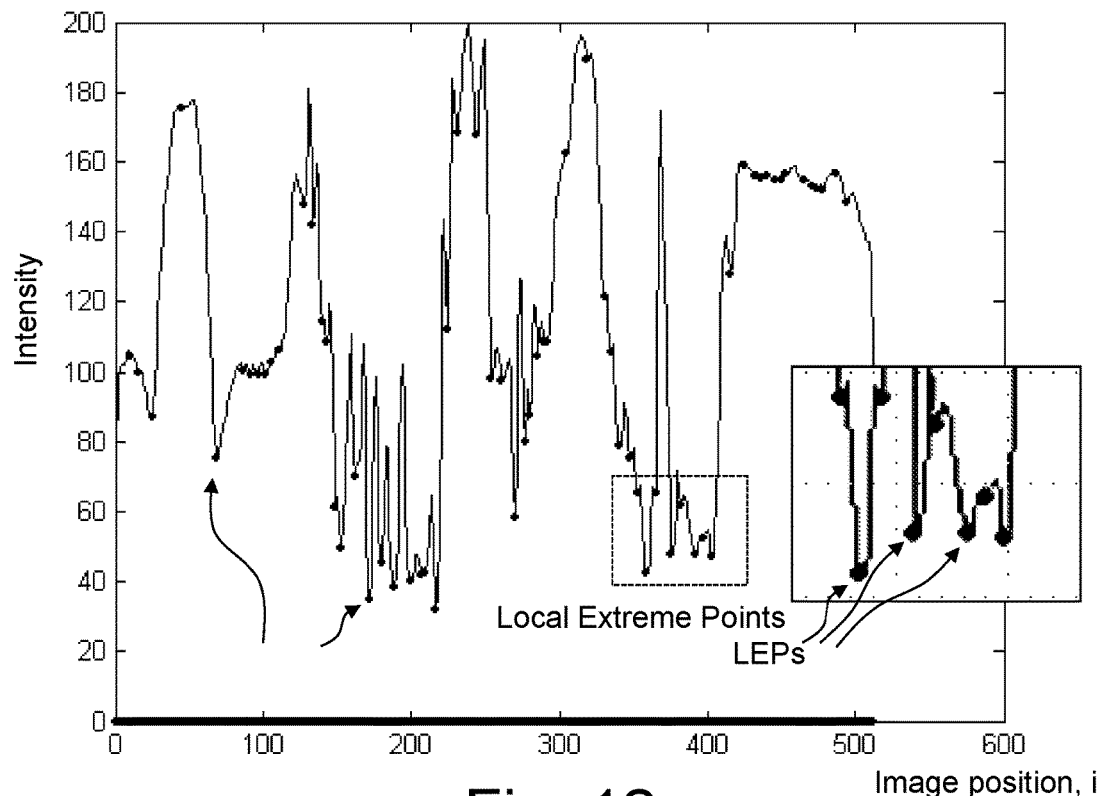

In FIG. 12, which is a simulation, a row from a standard image has been taken and the LEPs have been marked, i.e. the local 3×1 neighborhood. The NSIP operation is defined as (101) which means that the center pixel has not passed the threshold and its two nearest neighbors have both passed the threshold. This correspond to a local minimum point. Part of the image has been magnified to better illustrate the LEPs, indicated at black dots.

The row consists of 512 pixels. In this particular case there are almost 70 LEPs along the row.

Figure 13:
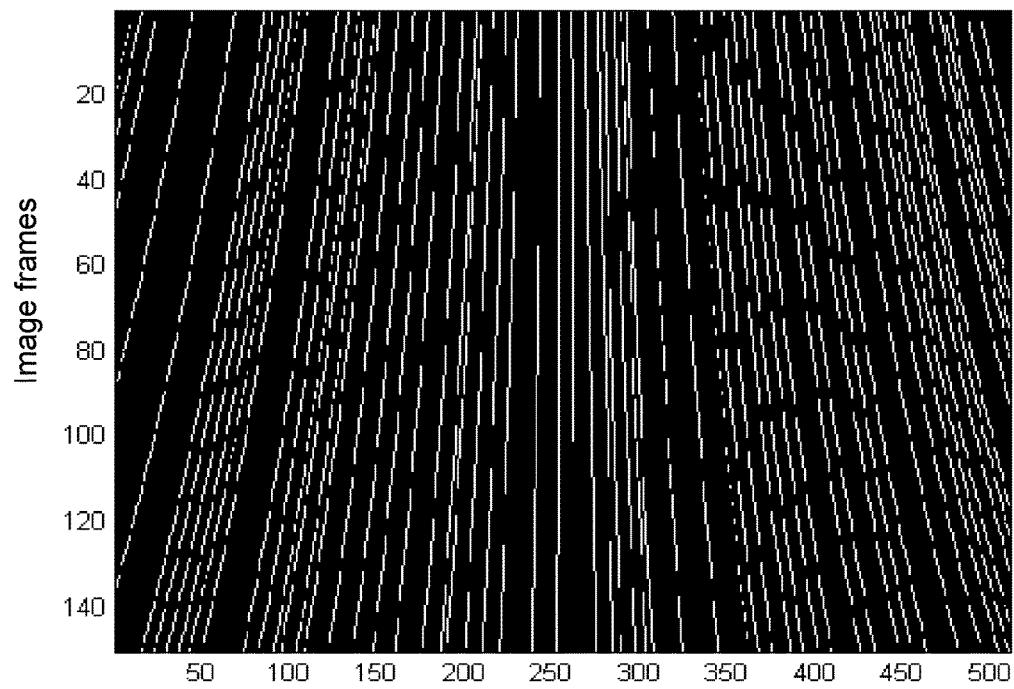
Figure 14:
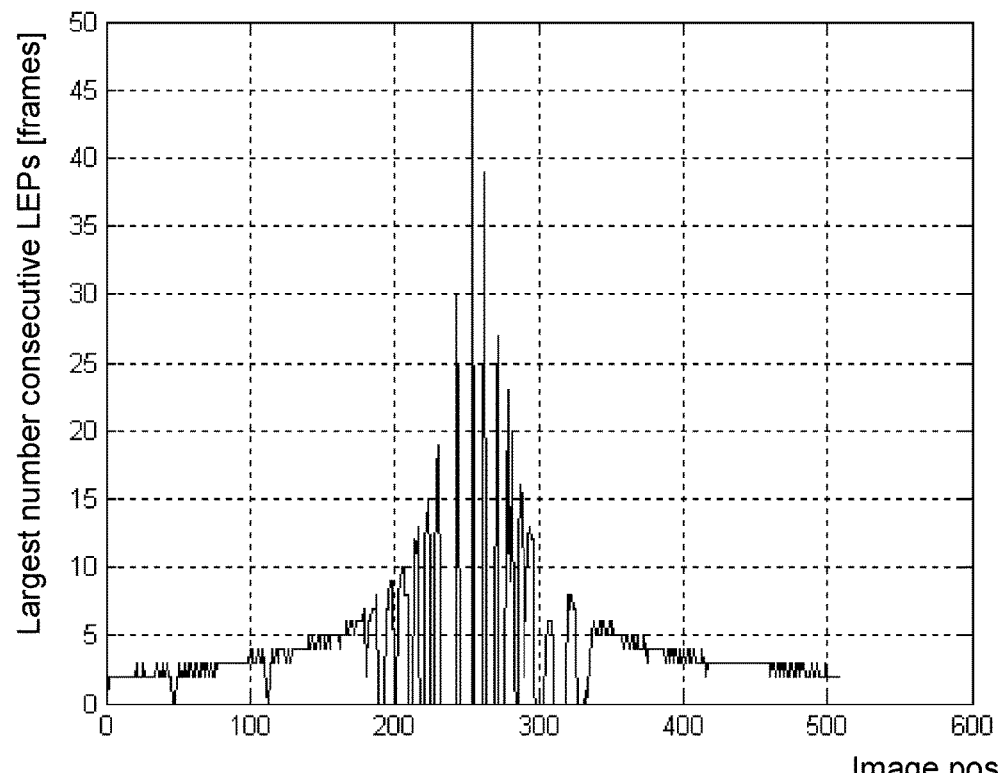

The LEPs are stored and compared to the next image and its LEPs. FIG. 13 shows what happens to the LEPs in a sequence of (1-dimensional) images. Here the Y-axis represents time, which means that the camera is slowly relatively moving towards an object. In this case we have captured 150 1-dimensional frames. In accordance with FIG. 2 it is seen that the LEPs close to the edges are moving faster compared to the LEPs in the center of the row who are almost stationary. The speed estimation is based on the slope of the lines, which are generated from each LEP as shown in FIG. 13. To calculate the value of the slopes we use the time that a maximum value stays within a pixel. This is done by counting the number of frames when the LEP is within one pixel. This value is inversely proportional to the fractional distance that a LEP moves between two consecutive frames The sum of these values f(i) can easily be extracted using the COUNT function as described above. For instance, taking M=50 frames, corresponding to a sequence of M image frames for computing the duration values, each bitslice processor is used to count the longest run of a possible LEP, that is, corresponding to the duration value. This will correspond to the first 50 lines in FIG. 13. FIG. 14 shows how the length of the runs varies along the array, that is, how the duration values f(i) for the sequence of 50 frames vary along image positions i. The unit is frames per pixel, i.e. how many frames are required to move a LEP one pixel.

Figure 15:
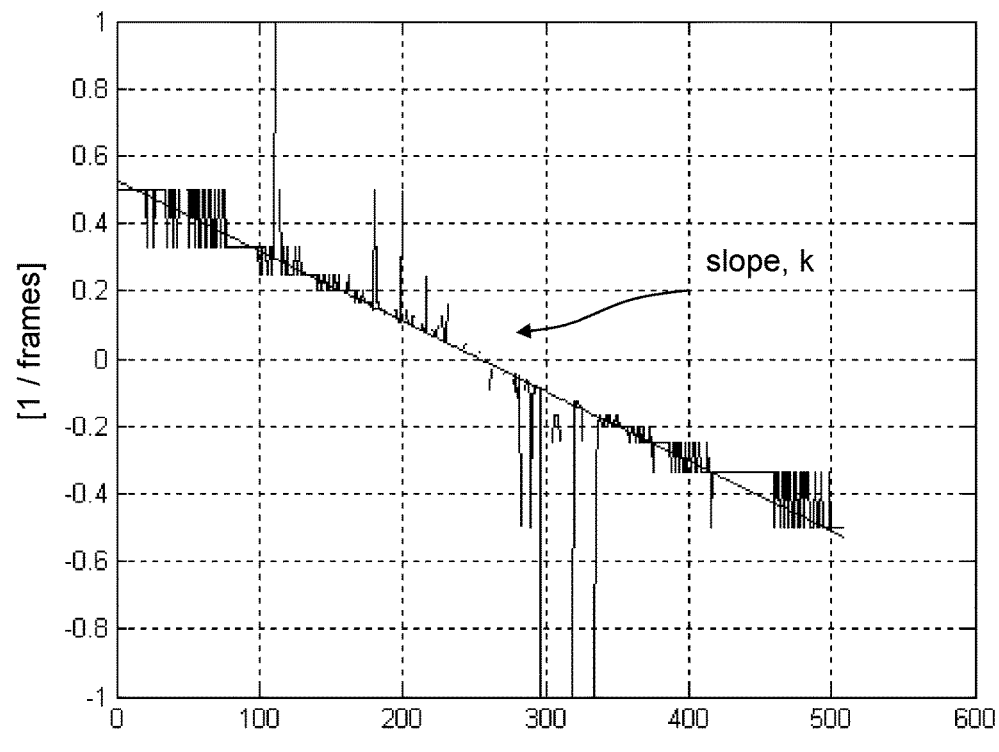

A desired function, shown in FIG. 15, is the inverse and has the unit pixel per frame, i.e. how many pixels, (or rather subpixels), has the LEP moved since the previous frame. The slope of the curve corresponds to the slope value k discussed above in connection with FIG. 3. A resulting computed slope value k, provided according to embodiments herein, has been plotted in FIG. 15 for reference.

Figure 3:
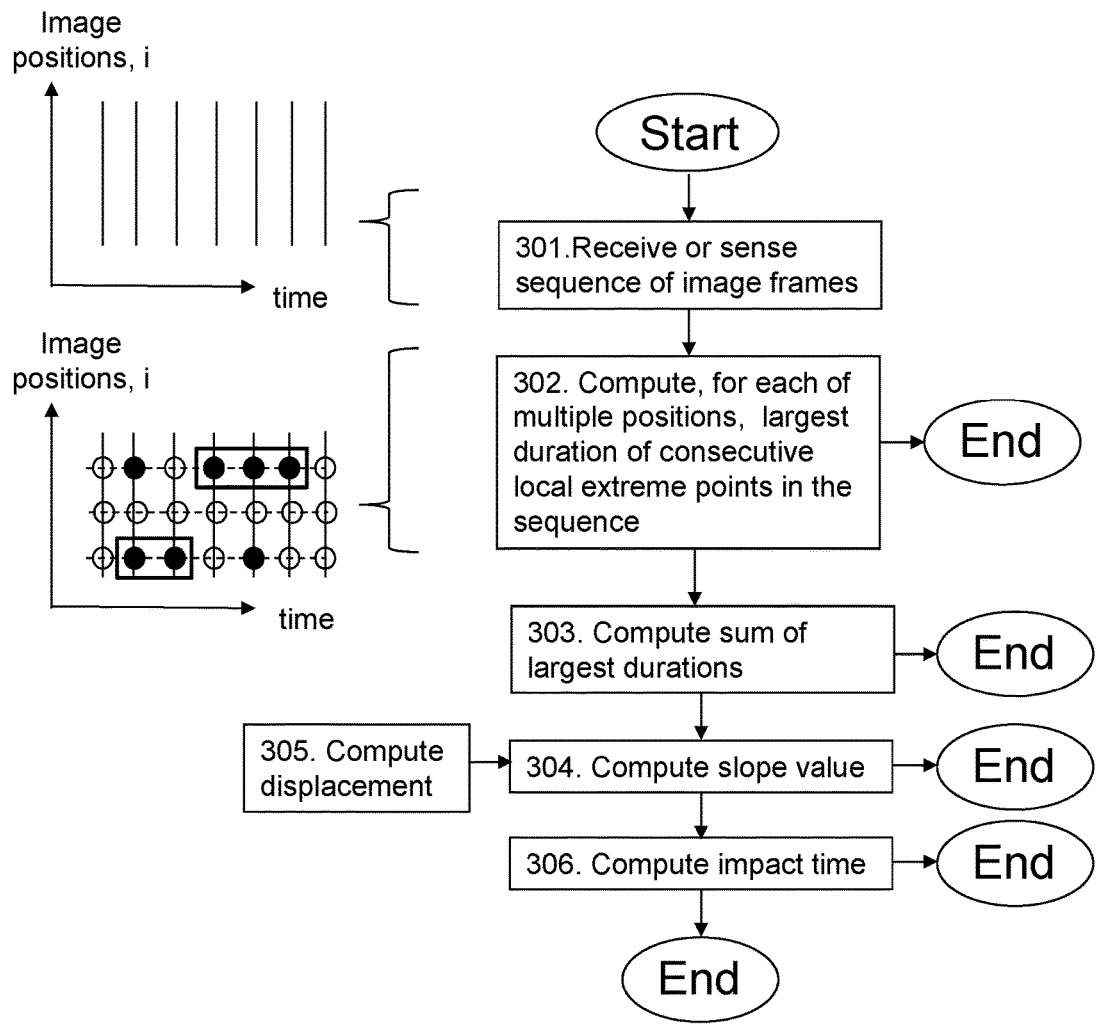

The equations presented above in connection with FIG. 3 will now be further explained, with reference to the specific embodiment and how the slope value k in FIG. has been accomplished from the duration values f(i).

In order to calculate the relative speed we will express distances in the sensor in pixel units. The 1-dimensional sensor has N pixels which take up a physical size of w [m]. Thus, a distance d in the sensor plane corresponds to p pixels where $$p = d\frac{N}{w} \qquad (12.)$$

Along the sensor we now have the function, f(i), corresponding to the duration value for each image position i, which is inverse to the line, the slope of which we are looking for.

This function can be expressed as $$f(i) = \frac{1}{k*i} + \Lambda, \qquad (13.)$$

where $\Lambda$ is a random variable, i.e. the noise, with a mean assumed to be zero. Therefore, $$\Sigma f(i) = \Sigma\left(\frac{1}{k*i} + \Lambda\right) \approx \Sigma\frac{1}{k*i} \qquad (14.)$$

Which leads to the following estimate of corresponding to what was discussed above in connection with FIG. 3, $$k \approx \frac{\Sigma \frac{1}{i}}{\Sigma f(i)} = \frac{c}{\Sigma f(i)}, \quad (15.)$$

where the numerator, c, thus correspond to the scale factor c discussed previously. Which may be regarded a constant which can be calculated in advance and the denominator is in the specific embodiment the output from the COUNT network, that is, corresponding to the previously discussed sum of duration values.

So far we have put the origin in the leftmost pixel. It is more natural to move the origin to the FOE point. Since, for frontal view motion, f(i) is symmetric we get $$\sum_{-\frac{N}{2}}^{\frac{N}{2}} f(i) \approx \sum_{-\frac{N}{2}}^{\frac{N}{2}} \left(\frac{1}{k*i}\right) = 0 \quad (16.)$$

Therefore, similar to Equation (4) we use instead $$\Sigma |f(i)| = \Sigma \left(\left|\frac{1}{k*i}\right| + \Lambda\right) \quad (17.)$$

This means that we can sum all the run lengths on both sides of the FOE as long the constant c is generated with the absolute value. Knowing the value of k we can now get the impact time by using Equation (11), which works not only for the car case but also for any visible objects.

When the x-position is close to the center-of-expansion we will not have correct information since the correct value would be infinite. We will therefore use a filter h(x) which is 0 in the center region and 1 outside.

$$h(i) = \begin{cases} 1, & i > H_0 \\ 0, & i \leq H_0 \end{cases} \quad (18.)$$

This function is stored in one register, see FIG. 9, and a multiplication is a simple AND-operation. This means that the constant sum, c in Equation (19), can be rewritten as $$\sum_{-\frac{N}{2}}^{\frac{N}{2}} \frac{1}{i} * h(i) = 2 * \sum_{H_0}^{\frac{N}{2}} \frac{1}{i} \quad (19.)$$

By omitting the information from the center, which typically contains a lot of noise, we get a better estimation of k, which corresponds to the line with slope k drawn in FIG. 15. Another issue that may occur is that there may be some positions along the active part of the array that are zero, i.e. there are no LEPs at those positions. From Equation (15) we see that the estimate of k will be larger if there are a number of zeros in f(i). To avoid this we can propagate the LEPs to the left and the right until we run into "a true" LEP or another propagated LEP, as illustrated in FIG. 16.

Figure 17:
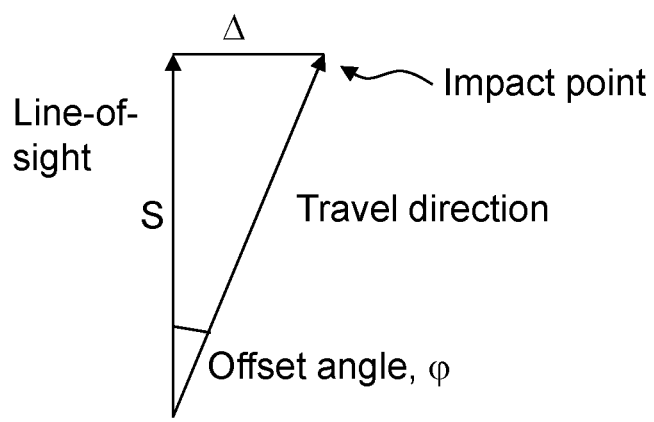
Figure 18:
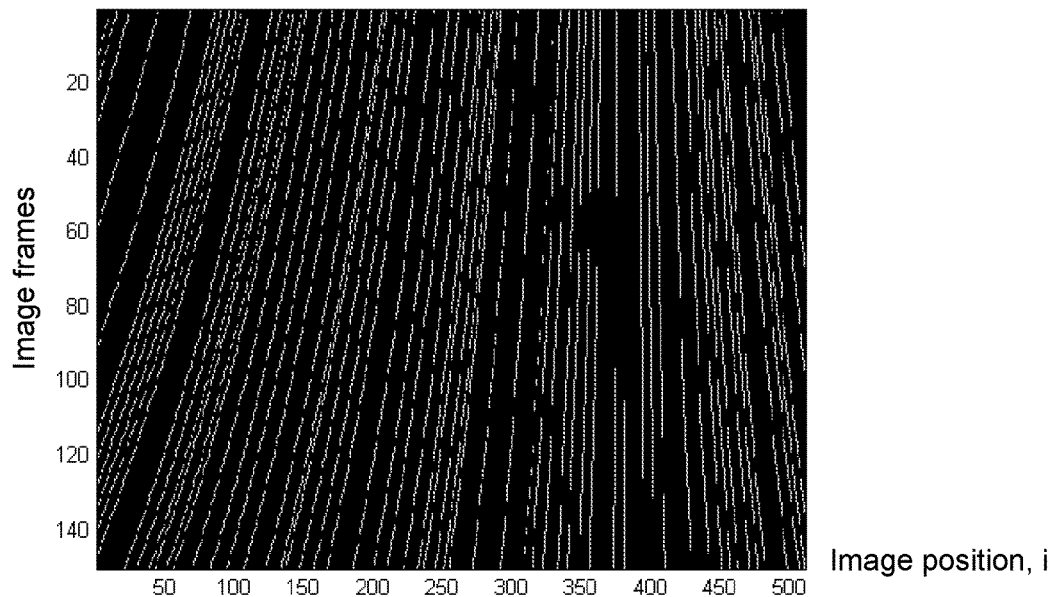
Figure 19:
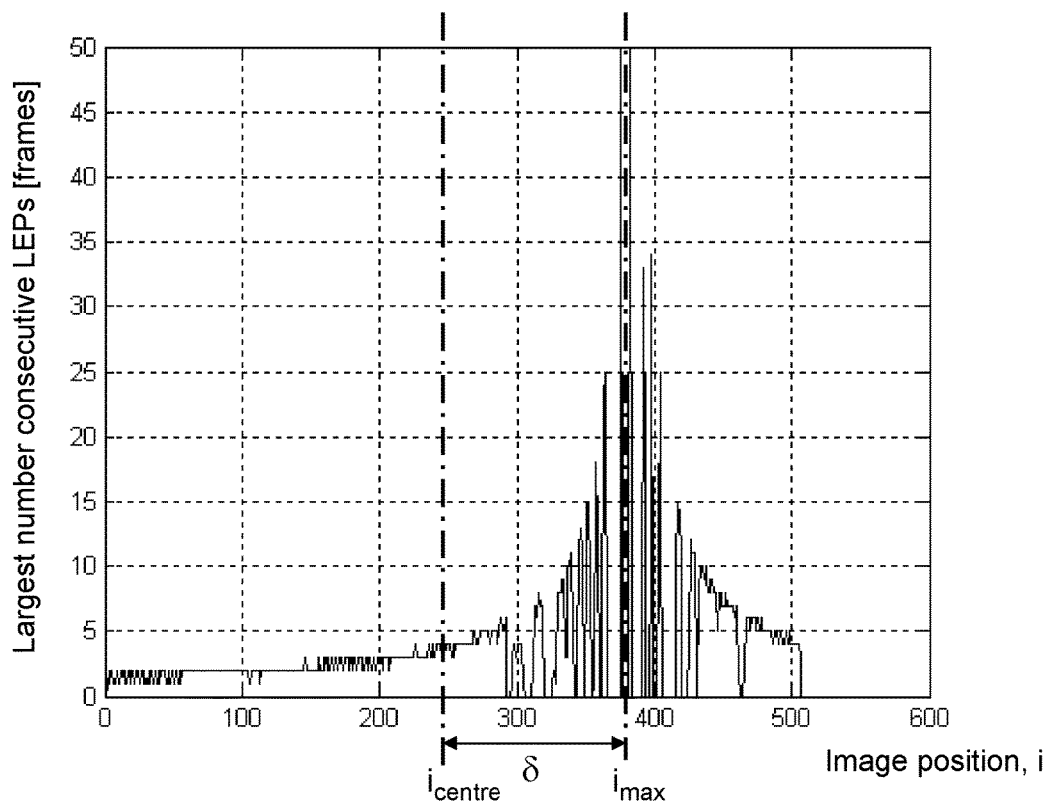
Figure 20:
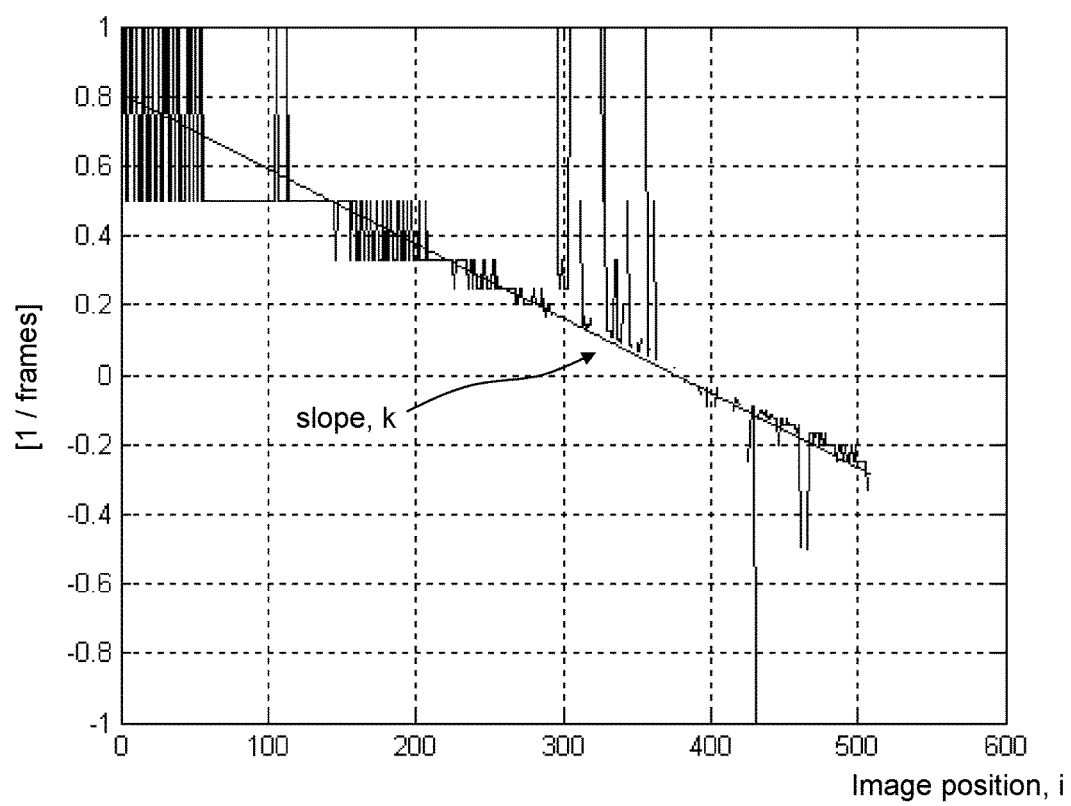

If the camera is looking in a different angle than the motion, there will be an added transversal component to the perpendicular motion. This means that instead of moving towards the point in the scene that projects onto the fixation point, the camera is heading towards an impact point located a distance Δ away as illustrated in FIG. 17. Given such as transversal speed component, the image that shows the movement of the LEPs will, given a transversal speed look like FIG. 18. We can estimate the position of the maximum value $i_{max}$ of the function f(i) in this case, shown in FIG. 19, corresponding to the new FOE position. The center image position i also shown in FIG. 19, as well i as the offset δ between $i_{max}$ and $i_{centre}$. How to do is this in case of the specific embodiment implemented on the NSIP processor, is described in Åström A, Forchheimer R, and Eklund J-E, "*Global Feature Extraction Operations for Near-Sensor Image Processing,*" IEEE Trans. Image Processing, 5, 1, 102-110 (1996). The corresponding inverse function of f(i) is shown in FIG. 20, with a line drawn with the slope value k, correspondingly as in FIG. 15, but here thus in the situation of non-frontal view.

It may be used a number of different masks, h(i), depending on the displacement of the maximum value from the center point. The constant, c, may be represented by a pre-calculated array which also depends on the displacement.

The computation of the value of k follows a similar path as earlier. The displacement 5 of the FOE in the image plane modifies the previous result to $$f(i) \approx \frac{1}{k*|(i-\delta)|} \quad (20.)$$

This means that c is a function of the displacement δ, which can be calculated as shown below.

$$k \approx \frac{\Sigma \frac{1}{|(i-\delta)|}}{\Sigma f(i)} = \frac{c(\delta)}{\Sigma f(i)} \quad (21.)$$

It is seen that this corresponds to the slope value k described in connection with FIG. 3. above and is also the k value plotted in FIG. 20.

As mentioned earlier it is possible to compute the impact time without knowledge of the absolute speed or distance to the object. Instead we have $$v_y = \frac{S}{T_i} \quad (22.)$$

The transversal speed can, for the same reason, not be computed to its absolute value. Instead it is defined as $$v_x = \frac{\Delta}{T_i}, \quad (23.)$$

where Δ is the distance shown in FIG. 17. This can be rewritten as $$v_x = \frac{\frac{w\delta}{Nf} \cdot S}{T_i} \quad (24.)$$

We can now compute the ratio between the transversal speed and the speed towards the object as $$\frac{v_x}{v_y} = \frac{w\delta}{Nf} = C_{camera} \cdot \delta. \quad (25)$$

This means that the displacement of the FOE multiplied by a camera constant, derived from the sensor width, the sensor resolution, and the focal length, gives the ratio between the two motion components. Thus the offset angle φ between line-of-sight and the motion vector is given by $$\tan(\alpha) = C_{camera} \cdot \delta \quad (26.)$$

Possible performance will now be discussed when implementing embodiments herein using an NSIP architecture as in the case of the more specific embodiment. Going through the different steps to be executed in the NSIP case, it can be found that the extraction of the LEPs can be done in a single instruction per exposure. Finding the longest run of a single LEP, that is corresponding to a duration value, in each processor slice is based on an SIMD implementation in which runs are accumulated and compared to the previously obtained longest run. Whenever a new run has been collected it either replaces the previous longest run or is discarded. This can be shown to require 18 b cycles where b is the number of bits used to store the result. To obtain the results shown in FIG. 14, 50 exposures, that is image frames, have been used which means that b equals 6. This corresponds to 108 cycles per exposure. The shortest time interval T is thus 2.5 us and a new k-value will be available after around 5000 cycles, or at a rate of 8 kHz, given a clock cycle of 40 MHz. Including the noise suppression filter discussed above, will add an estimated 30-60 cycles per exposure.

An alternative to this "batch-oriented" way is to store the last 50 exposures in a round-robin fashion, that is, corresponding to the situation discussed above in connection with FIG. 5, and do the k-value computation after each exposure. This will increase the interval between exposures to coincide with the computed k-values. Alternatively, a time stamp can be associated with the exposures so that the calculation of longest runs can be done continuously, thus eliminating the need for keeping all the 50 exposures in memory and also decreasing the computation time. In summary, for a modern NSIP design it seems reasonable that a chip of size less than 10 mm² will be able to output k-values, and thus impact time estimates, at a rate of around 100 kHz.

Hence, by using embodiments herein with the Near-Sensor Image Processing (NSIP) concept, or similar, such as Focal Plane Array concept mentioned previously, the implementation of a vision-based impact time sensor can be reduced to a small and potentially inexpensive device which can be suitable for many applications. One of the obvious applications is collision avoidance in the automotive industry. Such a system can be used to alert the driver that there is a risk for a collision. It can also be used, when the crash in inevitable, to alert the safety system before the actual crash.

Also, since implementation of embodiment herein may be on small and inexpensive devices and that, as realized, also can be made power efficient, they may be of particular interest for use in small, self-powered units. For example may embodiments herein be implemented in a device for guidance control, such as of small unmanned vehicles, including for example artificial insects. In case of such guidance control of an vehicle, two sensors (eyes) implementing embodiments herein may be used and the sum of the duration values f(i) values of the two sensors may be used to control and stabilize the vehicle. To avoid colliding with an object, these values should be as large as possible. Hence embodiments herein may for example be used for collision avoidance or warning, such as for the automotive industry, and for guidance control, in typically small unmanned, vehicles.

Figure 21:
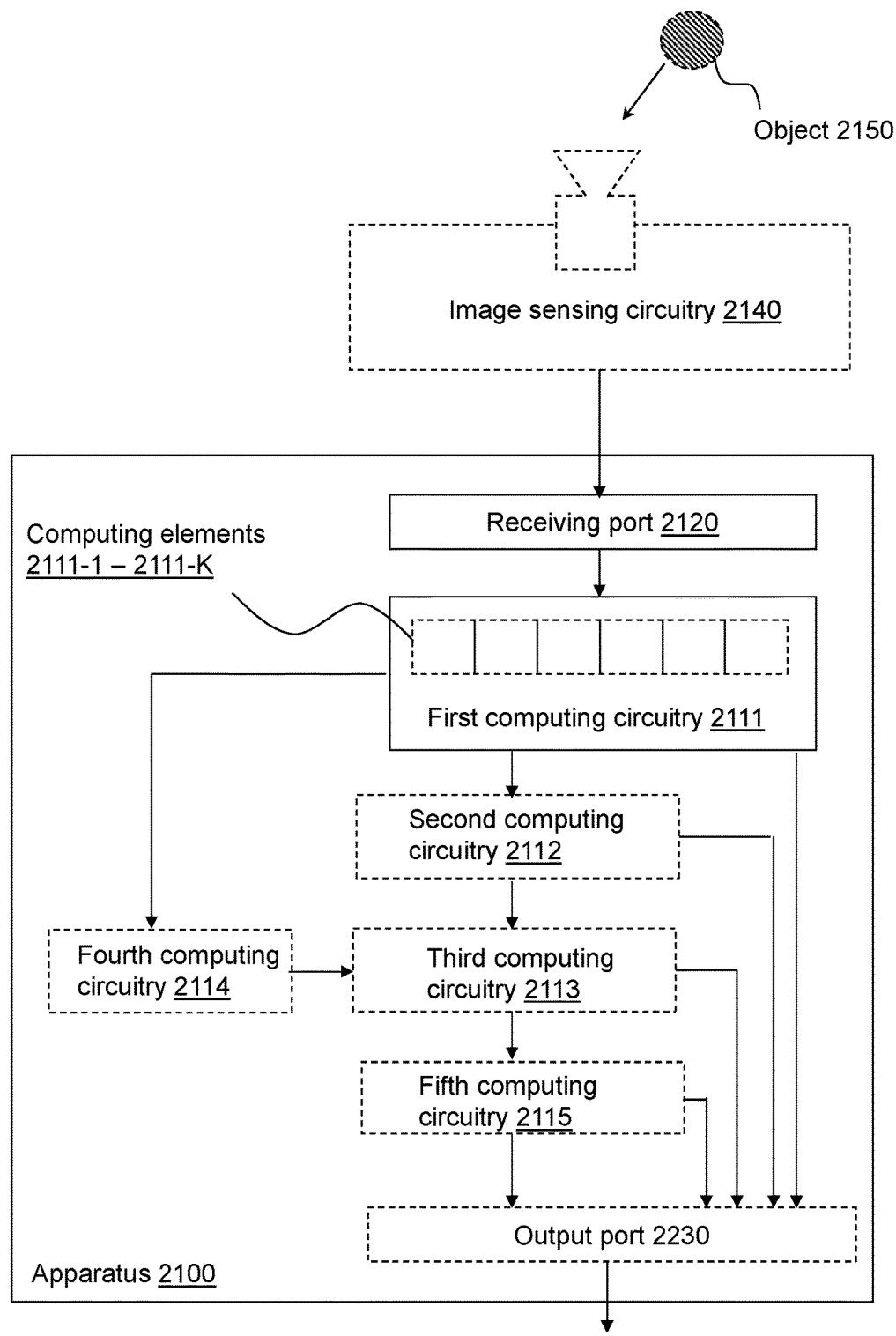

Embodiments herein will now be further described with reference to the schematic block diagram depicted in FIG. 21. To perform the actions discussed above in connection with FIG. 3, for enabling to compute impact time between an image sensing circuitry and an object relatively moving at least partially towards, or away from, the image sensing circuitry, an apparatus 2100, schematically depicted in FIG. 21, may be provided. The apparatus 2100 comprises a receiving port 2120. The receiving port is configured to image data associated with a respective image frame of a sequence 1 . . . N of image frames sensed by said image sensing circuitry and which image frames are imaging said object. For reference and to enhance understanding, the image sensing circuitry and object is shown in FIG. 21 as image sensing circuitry 2140 and object 2150. The receiving port may be any port, physical or virtual, that can receive the image data.

The apparatus further comprises a first computing circuitry 2111, configured to compute, for each one i of multiple image positions, a respective largest duration value f(i) indicative of a largest duration of consecutively occurring local extreme points in said sequence 1 . . . N of image frames. The apparatus 2211 may be a general purpose computer configured to execute particular program code, and in such case the computing circuitry may correspond to the CPU and RAM of the computer, or it may be a computer with more dedicated hardware for more efficient implementation of embodiments herein, such as based on a SIMD architecture. The first computing circuitry may comprise computing elements 2111-1-2111-K, each of which may be configured to compute duration values f(i) for one or a group of image positions.

The apparatus may further comprise a second computing circuitry 2112, configured to compute a sum Σf(i) of the duration values f(i).

The apparatus may further comprise a third computing circuitry 2113 configured to compute a slope value k based on an inverse 1/Σf(i) of the sum multiplied with the scale factor c, wherein the slope value k corresponds to:

$$k = \frac{c}{\Sigma f(i)},$$

where c is said scale factor and Σf(i) is said sum of the duration values f(i).

In some embodiments the scale factor c corresponds to:

$$c = \Sigma \frac{1}{|i|},$$

where i is a respective image position of said multiple image positions.

The apparatus 2100 may further comprise a fourth computing circuitry 2114, configured to compute an offset value δ indicative of the offset of an image position $i_{max}$ of a maximum duration value amongst the computed largest duration values f(i) in relation to a centre image position $i_{centre}$ of said multiple image positions, wherein the scale factor (c) corresponds to:

$$c = \Sigma \frac{1}{|(i-\delta)|},$$

where i is a respective image position of said multiple image positions and δ is said offset value.

The apparatus 2100 may further comprise a fifth computing circuitry 2115, configured to compute the impact time using the computed slope value (k), wherein the impact time ($T_I$) corresponds to:

$$TI = T\frac{1+k}{k},$$

where k is the computed slope value and T is the sample period of the image frames. One or more of the computing circuitry, may be implemented by one and the same computing circuitry, for example the first and second computing circuitry may be implemented in a common physical circuitry, for example a SIMD or NSIP type of processor, and/or the third, fourth and fifth circuitry may be implemented in another common physical circuitry, for example a general purpose CPU.

The apparatus 2100 may further comprise an output port 2230, configured to output the computed largest duration values f(i) and/or the computed sum Σf(i) of the duration values f(i) and/or the computed slope value k and/or the computed impact time TI, or one or many of these may be further used internally in apparatus 2100. That is, the apparatus 2100 may be configured to handle the resulting computed values corresponding to what was discussed above in connection with FIG. 3.

Those skilled in the art will appreciate that the receiving port, the first computing circuitry 2111, the computing elements 2111-1-2111-K, the second computing circuitry 2112, the third computing circuitry 2113, the fourth computing circuitry 2114, the fifth computing circuitry 2115 and the output port 2230 described above may refer to a combination of analog and digital circuits, and/or one or more processors configured with software and/or firmware, e.g. stored in memory (not shown), that, when executed by the one or more processors perform as described above. One or more of these processors, as well as the other hardware, may be included in a single application-specific integrated circuit (ASIC), or several processors and various digital hardware may be distributed among several separate components, whether individually packaged or assembled into a system-on-a-chip (SoC).

Figure 22:
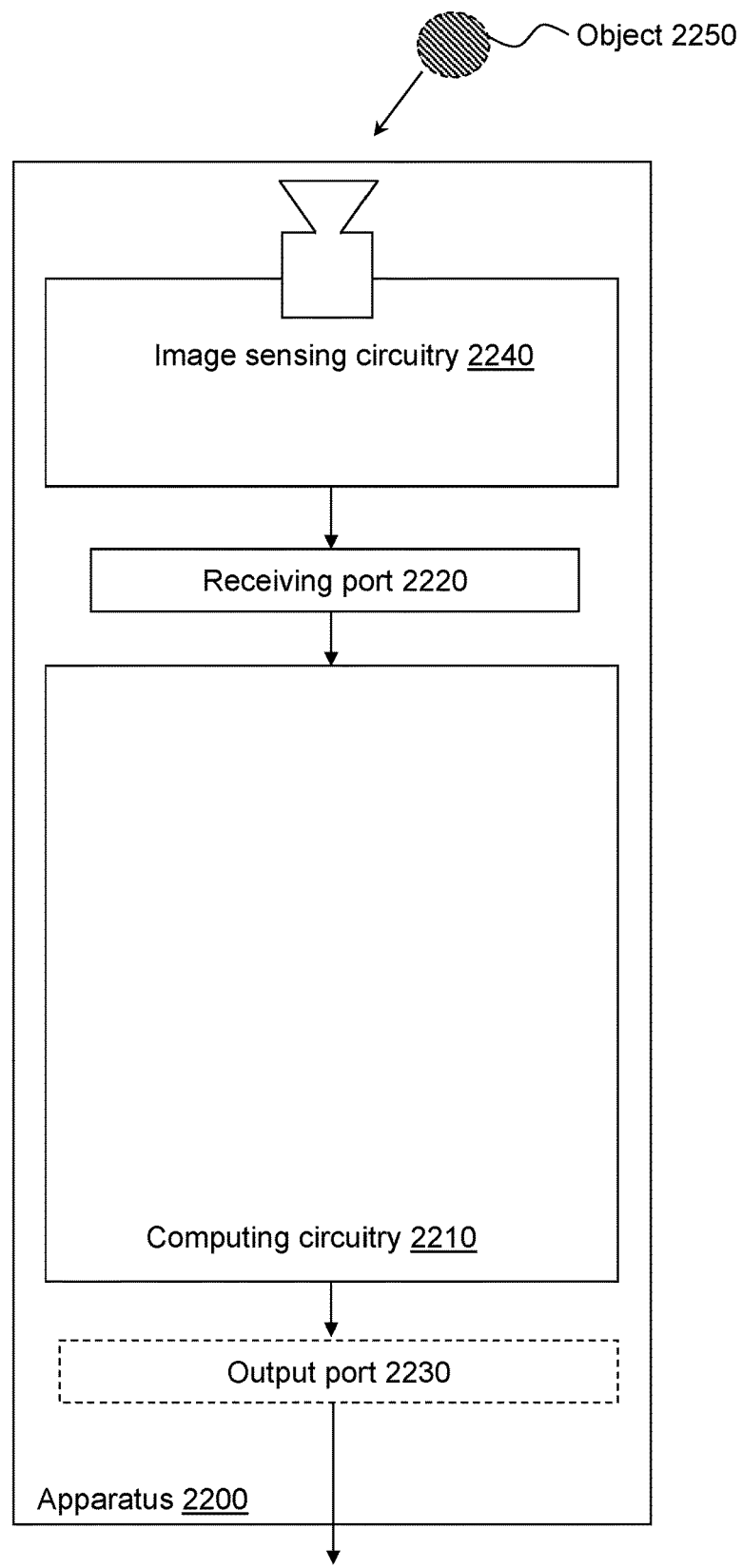

Embodiments herein will now be further described with reference to the schematic block diagram depicted in FIG. 22. To perform the actions discussed above in connection with FIG. 3, for enabling to compute impact time between an image sensing circuitry and an object relatively moving at least partially towards, or away from, the image sensing circuitry, an apparatus 2200, schematically depicted in FIG. 22, may be provided. The apparatus 2200 may correspond to the apparatus 2100 discussed above but additionally comprising the image sensing circuitry 2240 configured to sense the image frames of the sequence. Not to obscure with too much details, the first computing circuitry 2111, the computing elements 2111-1-2111-K, the second computing circuitry 2112, the third computing circuitry 2113, the fourth computing circuitry 2114, the fifth computing circuitry 2115, are shown as only one computing circuitry 2210 in FIG. 22.

Figure 23:
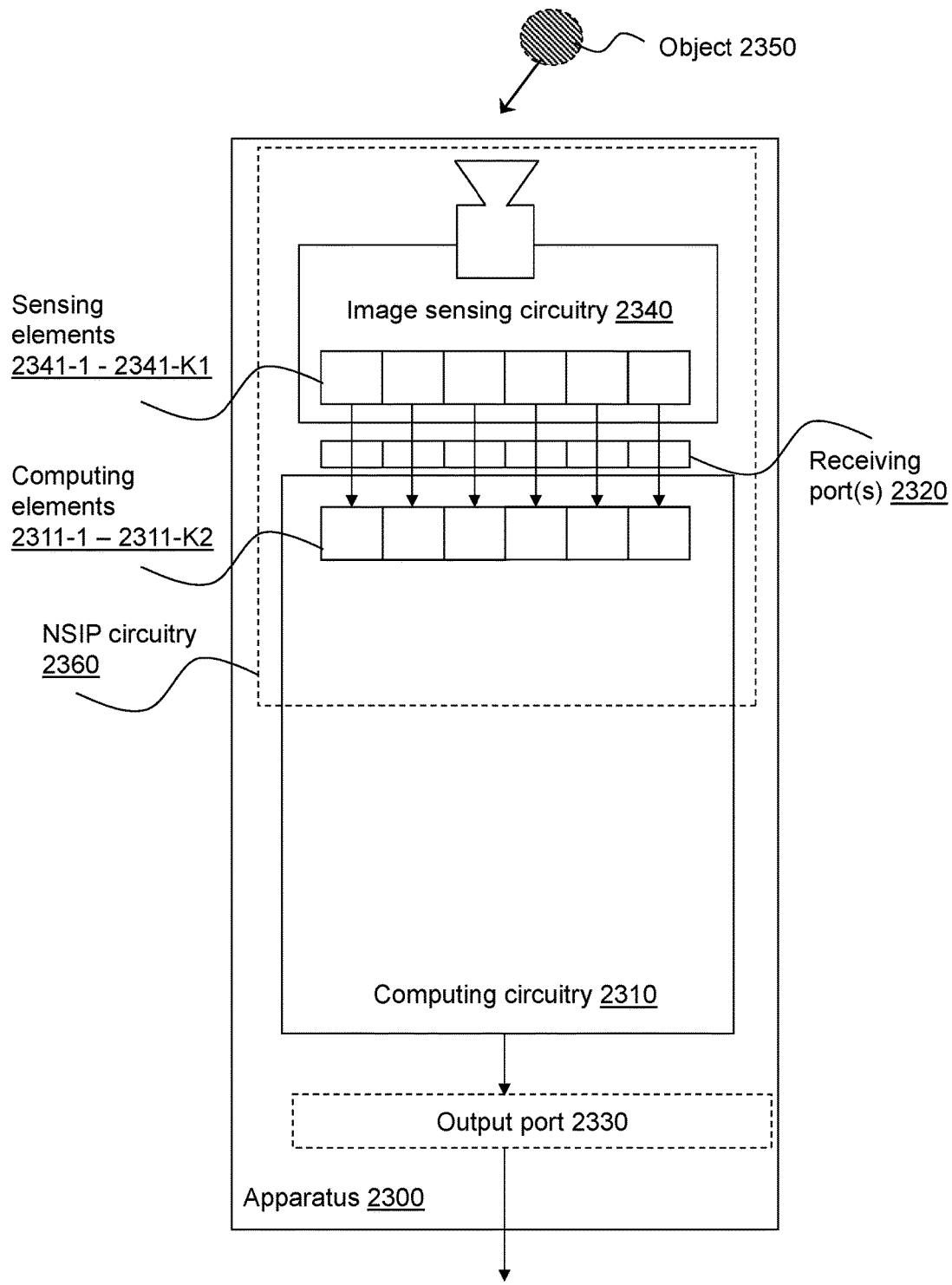

Embodiments herein will now be further described with reference to the schematic block diagram depicted in FIG. 23. To perform the actions discussed above in connection with FIG. 3, for enabling to compute impact time TI between an image sensing circuitry and an object relatively moving at least partially towards, or away from, the image sensing circuitry, an apparatus 2300, schematically depicted in FIG. 23, may be provided. The apparatus 2300 may correspond to the apparatus 2200 discussed above. Additionally, the image sensing circuitry, here 2340, comprises sensing elements 2341-1-2341-K1, each one being associated with a pixel position ip and configured to capture light. Each sensing element is further configured to, in response to captured light, provide local image data corresponding to a pixel. Also, the computing circuitry 2310, for example a part thereof corresponding to the first computing circuitry 2111 and/or the second computing circuitry 2112, comprises computing elements 2311-1-2311-K2. Each computing element is associated with one of or a group of the sensing elements and thereby also corresponding pixel position/s. A computing element that is associated with a pixel position/s that corresponds to one of the multiple image positions i, is configured to compute the respective duration value f(i) based on local image data from the associated sensing element/s The number K1 of sensing elements may correspond to the number K2 of computing elements, however, it is also possible with a greater number of sensing elements than computing elements, so that each computing element handle image data from more than one sensing element. The apparatus 2300 can further include an output port 2330.

The image sensing circuitry 2340 and the computing circuitry 2310, at least the part comprising the computing elements may correspond to an NSIP circuitry 2310, which for example may be the architecture discussed above in connection with the more detailed embodiment, or a another NSIP or FPA architecture. In this case the receiving ports, here 2320, may correspond to a respective physical interface over which the sensing elements deliver image data to the computing elements.

Slope from Impact Time

Figure 24:
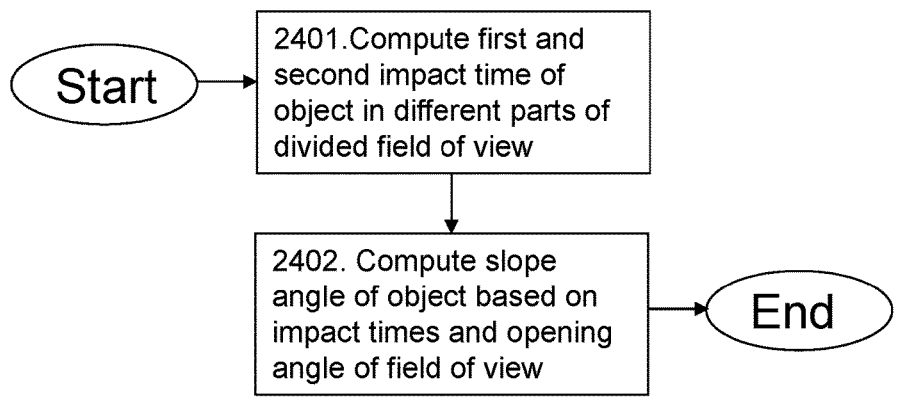

A second type of embodiments herein, for computing a slope angle β of a surface of an object relatively moving at least partially towards, or away from, an image sensing circuitry imaging said object, said surface facing said image sensing circuitry, will now be described with reference to the flowchart depicted in FIG. 24.

Action 2401

In this action, it is being computed, using image frames sensed by the image sensing circuitry, a first impact time T1 and a second impact time T2 between the image sensing circuitry and the object. The first impact time is computed based on a first field A of a divided field of view of said image sensing circuitry and the second impact time being computed based on a second field B of the divided field of view, Action 2402

In this action, the slope angle is being computed based on the computed first impact time, the second impact time and an opening angle (2*α) associated with the field of view. The computed slope angle β may correspond to:

$$\beta = \arctan\left(\frac{T_2 - T_1}{T_1 + T_2} \cdot \frac{2}{\tan(\alpha)}\right),$$

where β is the slope angle, T1 is the first impact time, T2 is the second impact time and α is half of the opening angle.

The computing of the first impact time T1 and the second impact time T2 may be performed in parallel.

The computing of the first impact time T1 and the second impact time T2 may be performed, at least partially, in accordance with the embodiments herein discussed above in connection with FIG. 3.

Refer now back to FIG. 8. The second type of embodiments herein as described above in connection with FIG. 24 and related Actions, may be implemented by a computer program product, loadable into the internal memory of a computer, comprising software for executing the Actions. For example may the computer program product be executable file 173 stored on a hard drive or other storage means 173 and may be retrievable therefrom via a network, such as the Internet, and downloaded to a computer 176, which may be the computer for the execution, or an intermediate computer for storage. The computer program product may also be stored in a memory stick 171 or a disc 172, such as CD or DVD, to mention some further examples. The memory stick 171 and the disc 172 are also examples of a computer readable medium, which have a program recorded thereon, where the program is arranged to make the computer execute Actions as discussed above in connection with FIG. 24.

Figure 25:
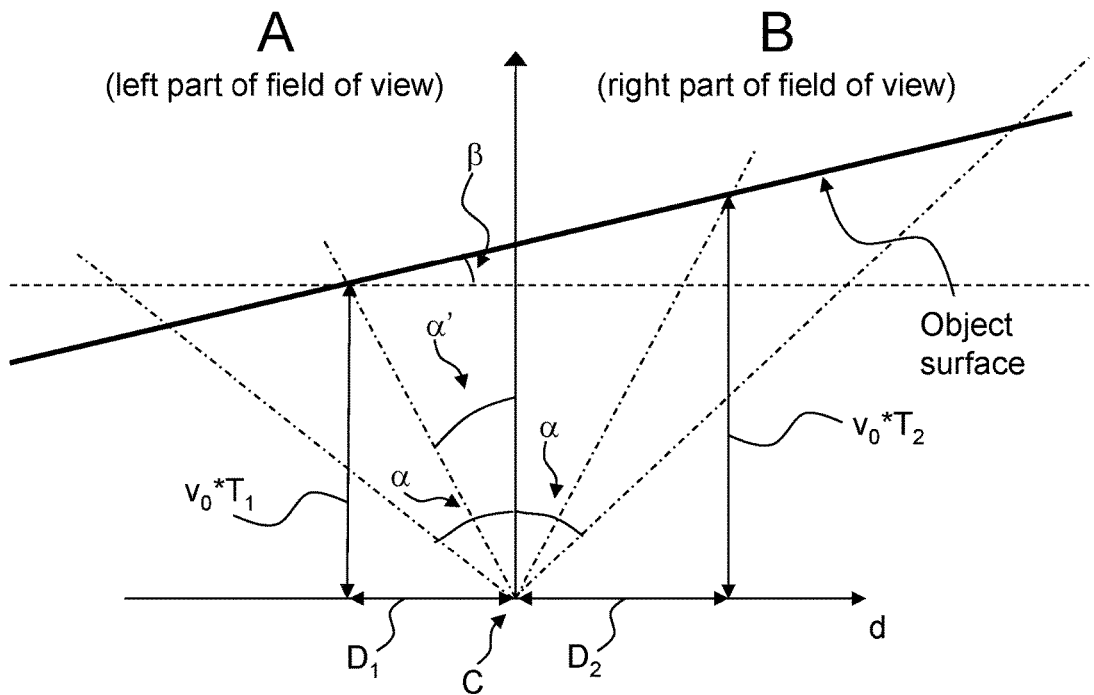

For better understanding of the Actions described above in connection with FIG. 24, a more detailed discussion will follow, with reference to FIG. 25.

When using impact time we do not obtain the absolute distance to the object, H0, nor the absolute value of the speed, v0. What we do obtain is the ratio $$T_i = \frac{H_0}{v_0} \tag{26.}$$

As pointed out earlier this means that we cannot distinguish if the camera is close to the object and moves at slow speed or if it is far away moving at a high speed toward the object. However, assuming that the object is a plane it is possible to calculate how much it is tilted with respect to the approaching camera. We divide the field of view into two parts, shown as A and B in FIG. 25. We continuously measure the TTI for the two parts, T1 and T2.

It is seen that $$D_1 = v_0 \cdot T_1 \cdot \tan(\alpha') \tag{27.}$$

and $$D_2 = v_0 \cdot T_2 \cdot \tan(\alpha') \tag{28.}$$

where α is the angular opening for each part of the field-of-view and α' is an angle that corresponds to half of the sensor as according to $$\tan(\alpha') = \frac{\tan(\alpha)}{2} \tag{29.}$$

For small α, this correspond to $$\alpha' \approx \frac{\alpha}{2} \tag{30.}$$

The slope of the object, β, can now be descried as $$(D_1 + D_2) \cdot \tan(\beta) = v_0 \cdot (T_2 - T_1) \tag{31.}$$

And it can be simplified as $$\tan(\beta) = \frac{T_2 - T_1}{D_1 + D_2} = \frac{T_2 - T_1}{T_1 + T_2} \cdot \frac{2}{\tan(\alpha)} \tag{32.}$$

This means that the tangent of the slope is only depending on the two TTI values T1 and T2 from the two field-of-views and the angular opening a.

Embodiments herein will now be further described with reference to the schematic block diagram depicted in FIG. 26. To perform the actions discussed above in connection with FIG. 24, for computing a slope angle of an surface of an object relatively moving at least partially towards, or away from, an image sensing circuitry imaging said object, an apparatus 2600, schematically depicted in FIG. 26, may be provided. The apparatus comprises a first computing circuitry 2611, configured to compute, using image frames sensed by the image sensing circuitry, a first impact time T1 and a second impact time T2 between the image sensing circuitry and the object, the first impact time being computed based on a first field A of a divided field of view of said image sensing circuitry and the second impact time T2 being computed based on a second field of the divided field of view. The apparatus further comprises a second computing circuitry 2612, configured to compute the slope angle based on the computed first impact time T1, the second impact time T2 and a respective opening angle 2*α associated with the field of view. The computation may be performed as describe above. The apparatus 2600 can further include an output port 2630.

The first and second computing circuitry may be comprised in one common computing circuitry 2610.

Figure 26:
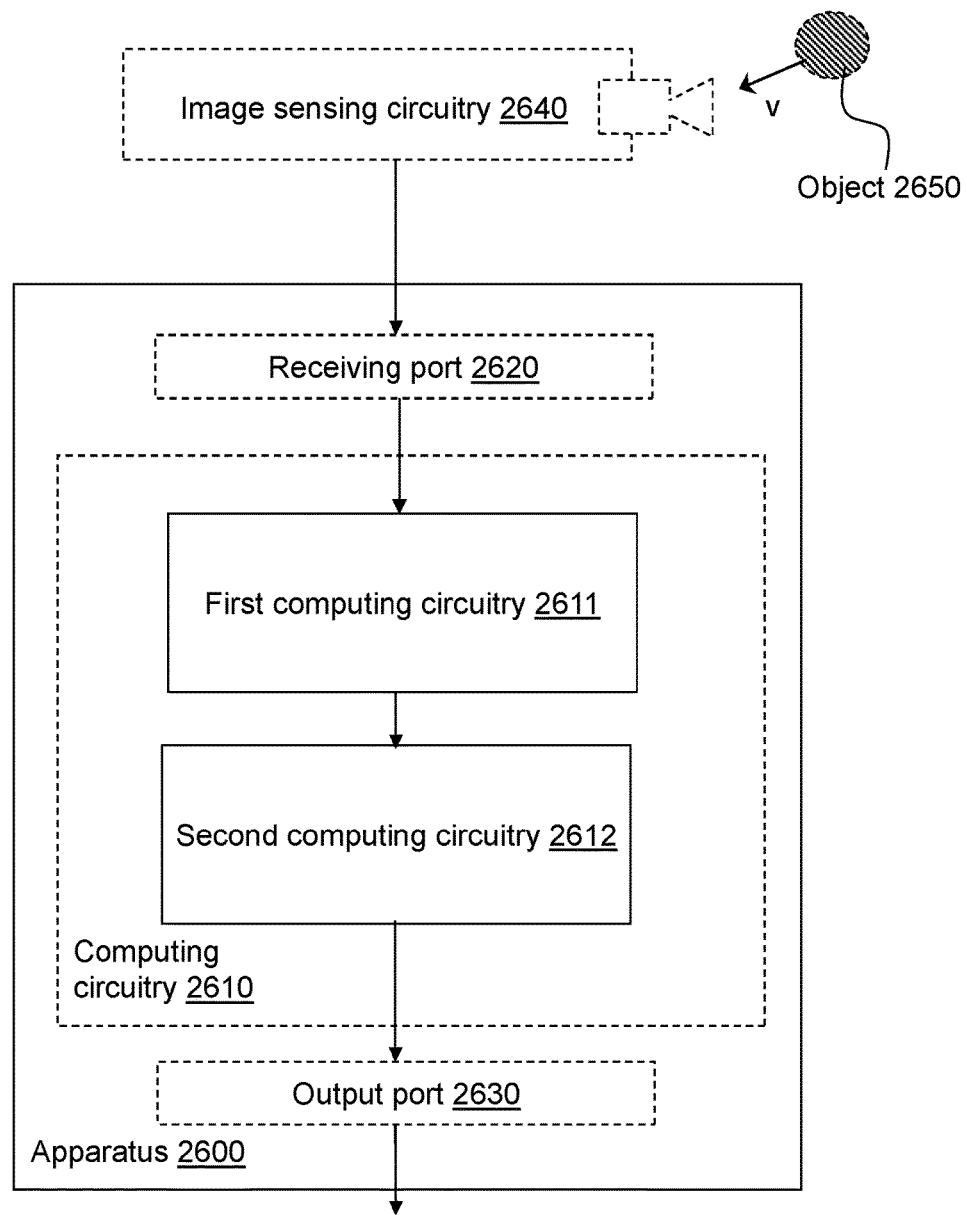

For reference and to enhance understanding, the image sensing circuitry and object is shown in FIG. 26 as image sensing circuitry 2640 and object 2650. The image sensing circuitry 2640 is shown outside the apparatus 2600, however, in some embodiments it may instead be comprised in the apparatus 2600. For example may the first computing circuitry 2611 comprise the apparatus 2200 or 2300 discussed in the foregoing, configured to provide the respective impact time internally in the first computing circuitry. It is also possible to use any other kind of impact time providing apparatus based on sensed image frames for provision of the impact time values.

The apparatus 2600 may comprise a receiving port 2620. The receiving port may be configured to receive image data associated with image frames sensed by said image sensing circuitry and which image frames are imaging said object. This may be the case when the image sensing circuitry 2640 is outside the apparatus 2600. In such situation the first computing circuitry may additionally comprise the first, second, third and fifth computing circuitry 2111, 2112, 2113 and 2115 (and additionally also the fourth computing circuitry 2114) discussed above in connection with FIG. 21 for provision of the impact times.

Hence, the apparatus 2600 may comprise the apparatus 2100, 2300 or 2200 as described above, or circuitry thereof, configured to be provide the first impact time T1 and/or the second impact time T2. However, it should be noted that also other means for providing impact times from sensed image frames may be used.

A robot may be provided comprising the apparatus 2600, for enabling the robot to by vision identify the slope angle.

Stereo from Impact Time

Figure 27:
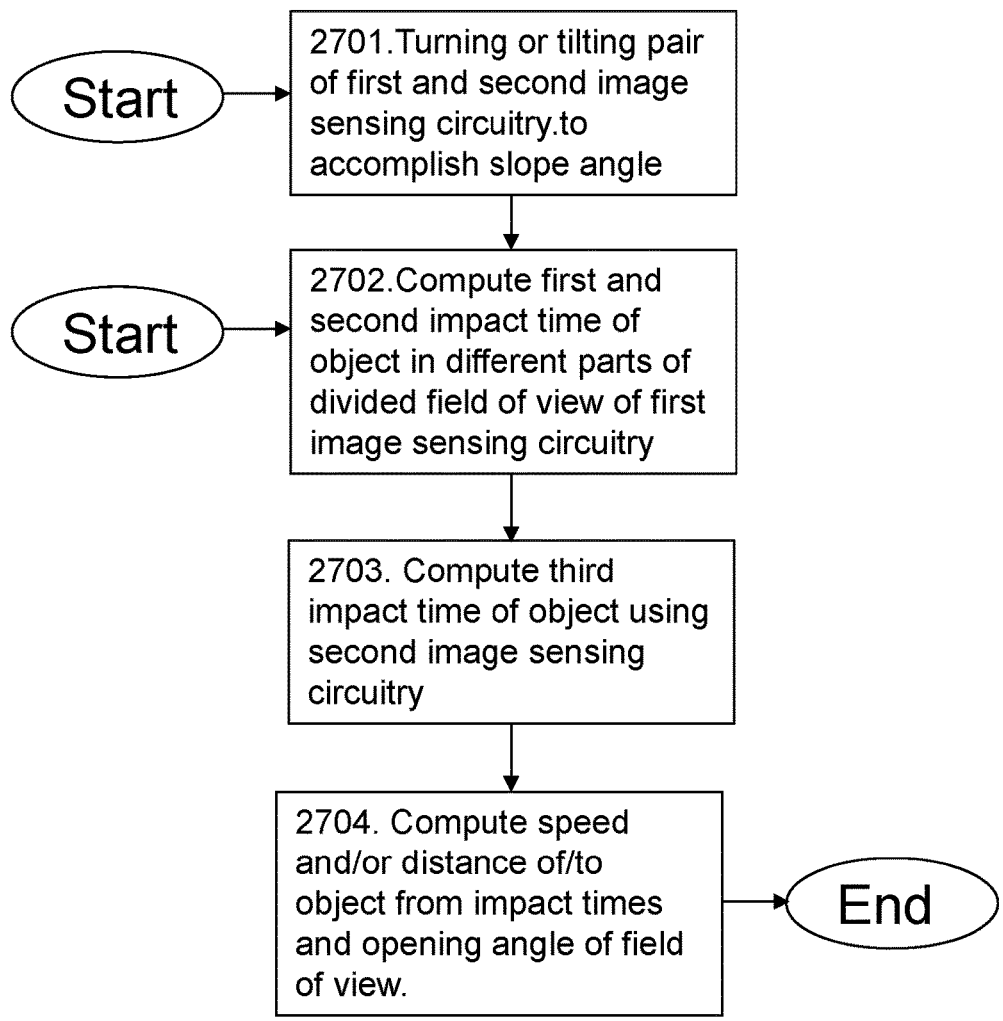

A third type of embodiments herein, for computing absolute speed v0 and/or absolute distance H0 to an object relatively moving at least partially towards, or away from, a pair of a first and second image sensing circuitry imaging said object, will now be described with reference to the flowchart depicted in FIG. 27.

Action 2701

In this action, which is an optional action, the action can include turning or tiling a pair of first and second image sensing circuitry to accomplish a slope angle.

Action 2702

In this action, the action can including computing a third impact time of an object using second image sensing circuitry.

Action 2703

In this action, the action can include computing a third impact time of an object using second image sensing circuitry.

Action 2704

In this action, the action can include computing speed and/or distance of/to an object from impact times and opening angle of field of view.

Refer now back to FIG. 8. The second type of embodiments herein as described above in connection with FIG. 27 and related Actions, may be implemented by a computer program product, loadable into the internal memory of a computer, comprising software for executing the Actions. For example may the computer program product be executable file 173 stored on a hard drive or other storage means 173 and may be retrievable therefrom via a network, such as the Internet, and downloaded to a computer 176, which may be the computer for the execution, or an intermediate computer for storage. The computer program product may also be stored in a memory stick 171 or a disc 172, such as CD or DVD, to mention some further examples. The memory stick 171 and the disc 172 are also examples of a computer readable medium, which have a program recorded thereon, where the program is arranged to make the computer execute Actions as discussed above in connection with FIG. 27.

Figure 28:
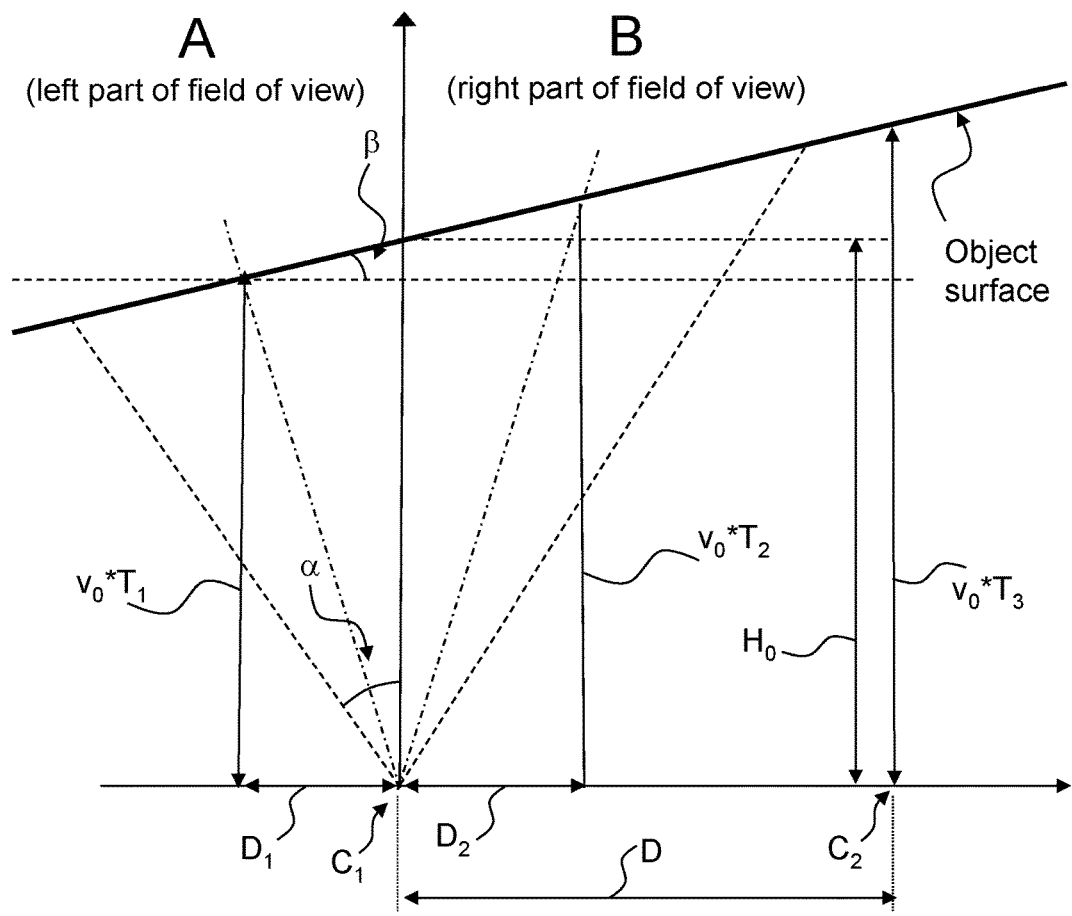
Figure 29:
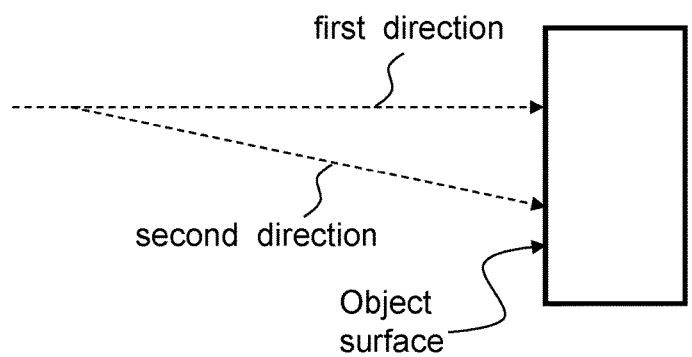

For better understanding of the Actions described above in connection with FIG. 27, a more detailed discussion will follow, with reference to FIG. 28 and FIG. 29.

Depth information can be achieved when two cameras act as a stereo pair. This is based on correlating feature points from one camera image to the other. Such an operation is complex both in terms of computational demands and data transfer. Let us now assume that we use two TTI cameras, C1 and C2 at a certain distance D as shown in FIG. 9.

If β is non-zero we have $$D \cdot \tan(\beta) \approx v_0 \cdot T_3 - v_0 \cdot \frac{T_1 + T_2}{2} \qquad (33.)$$

Where v0 is the absolute speed, T1 and T2 are the TTIs for the two fields-of-view in C1 using the same setting as in FIG. 8 and T3 is the TTI for the second camera C2.

We can now express the absolute speed as $$v_0 = \frac{D \cdot \tan(\beta)}{T_3 - \frac{T_1 + T_2}{2}} \qquad (34.)$$

$$= \frac{2 \cdot D \cdot \tan(\beta)}{2 \cdot T_3 - T_1 - T_2}$$

And by inserting the value for tan(β) we get $$v_0 = 2 \cdot D \cdot \frac{T_2 - T_1}{T_1 + T_2} \cdot \frac{2}{\tan(\alpha)} \frac{1}{2 \cdot T_3 - T_1 - T_2} \qquad (35.)$$

$$= \frac{4 \cdot D}{\tan(\alpha)} \cdot \frac{T_2 - T_1}{2 \cdot T_1 T_3 + 2 \cdot T_2 T_3 - (T_1 + T_2)^2}$$

The absolute distance as $$H_0 = v_0 \cdot T_3 \qquad (36.)$$

$$= \frac{2 \cdot D \cdot \tan(\beta)}{2 - \frac{T_1 + T_2}{T_3}}$$

$$= 2 \cdot D \cdot \tan(\beta) \frac{T_3}{2 \cdot T_3 - T_1 - T_2}$$

This can be reduced to $$H_0 = v_0 \cdot T_3 \qquad (37.)$$

$$= \frac{4 \cdot D}{\tan(\alpha)} \cdot \frac{T_2 T_3 - T_1 T_3}{2 \cdot T_1 T_3 + 2 \cdot T_2 T_3 - (T_1 + T_2)^2}$$

The Equations are valid for non-zero values of β. If T1=T2, we cannot acquire the depth information An interesting feature is that we can acquire depth information without correlating the images from the two sensors. Given an autonomous system where we obtain TTI-values, we can slightly turn to the left or the right and thereby obtaining a non-zero angle, β. FIG. 29 shows an example where we turn from the direction A to B to obtain a non-zero angle, β.

Figure 30:
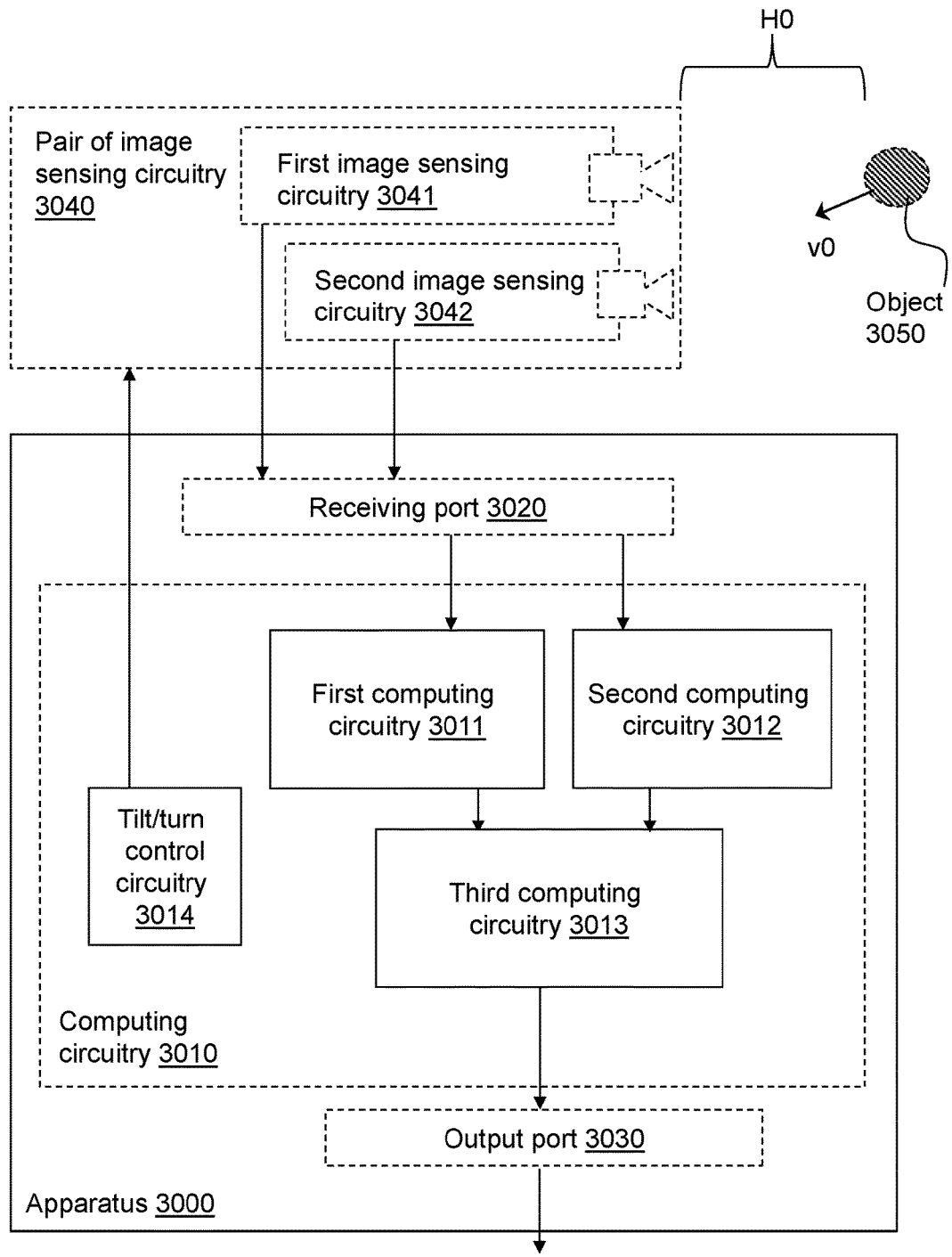

Embodiments herein will now be further described with reference to the schematic block diagram depicted in FIG. 30. To perform the actions discussed above in connection with FIG. 27, for computing absolute speed v0 and/or absolute distance H0 to an object relatively moving at least partially towards, or away from, a pair of a first and second image sensing circuitry imaging said object, an apparatus 2600, schematically depicted in FIG. 30, may be provided. The system shown in FIG. 30 can include an apparatus 3000, computing circuitry 3010, first computing circuitry 3011, second computing circuitry 3012, third computing circuitry 3013, tilt/turn control circuitry 3014, a receiving port 3020, an output port 3030, a pair of image sensing circuitry 3040, a first image sensing circuitry 3041, a second image sensing circuitry 3042, and an object 3050.

Shape from Impact Time

Figure 31:
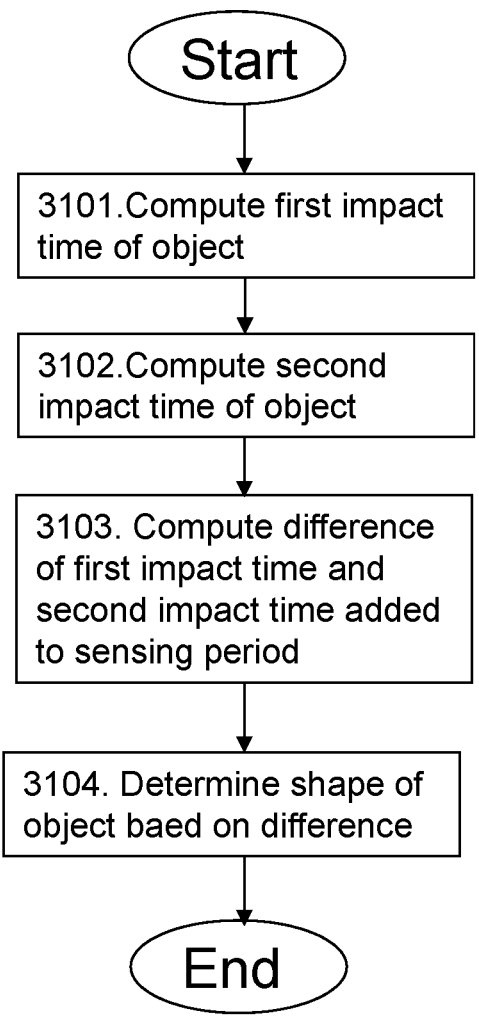

A fourth type of embodiments herein, for determining a shape of an object relatively moving at least partially towards, or away from, an image sensing circuitry imaging said object, will now be described with reference to the flowchart depicted in FIG. 31.

Action 3101

In this action, the action can include computing first impact time of object.

Action 3102

In this action, the action can including computing second impact time of object.

Action 3103

In this action, the action can include computing difference of first impact time and second impact time added to the sensing period.

Action 3104

In this action, the action can include determining the shape of the object based on difference.

Refer now back to FIG. 8. The fourth type of embodiments herein as described above in connection with FIG. 31 and related Actions, may be implemented by a computer program product, loadable into the internal memory of a computer, comprising software for executing the Actions. For example may the computer program product be executable file 173 stored on a hard drive or other storage means 173 and may be retrievable therefrom via a network, such as the Internet, and downloaded to a computer 176, which may be the computer for the execution, or an intermediate computer for storage. The computer program product may also be stored in a memory stick 171 or a disc 172, such as CD or DVD, to mention some further examples. The memory stick 171 and the disc 172 are also examples of a computer readable medium, which have a program recorded thereon, where the program is arranged to make the computer execute Actions as discussed above in connection with FIG. 31.

Figure 32:
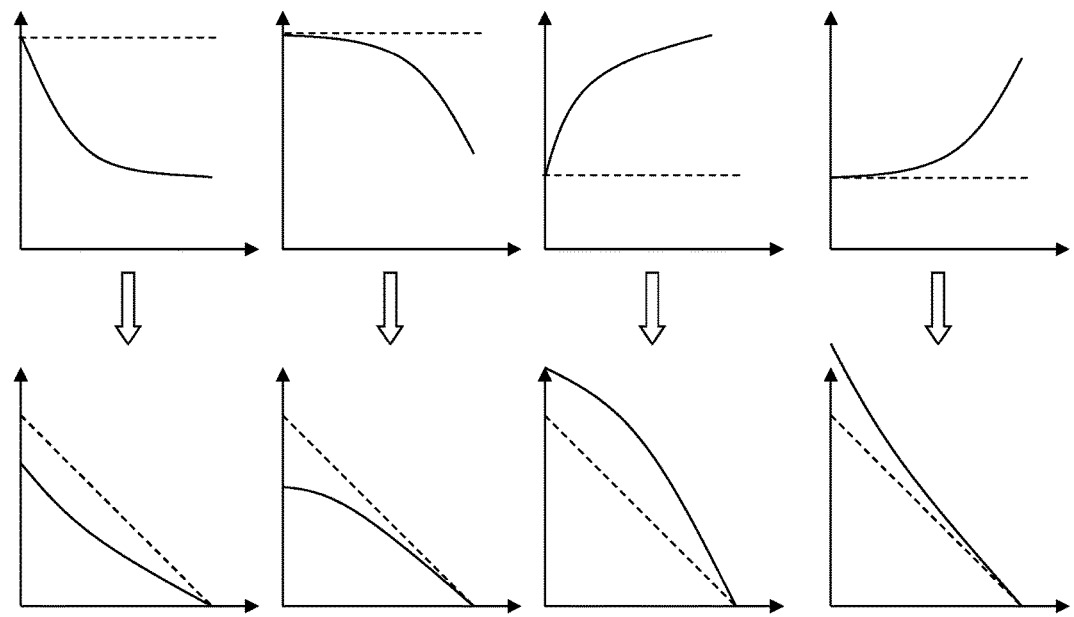
Figure 33:
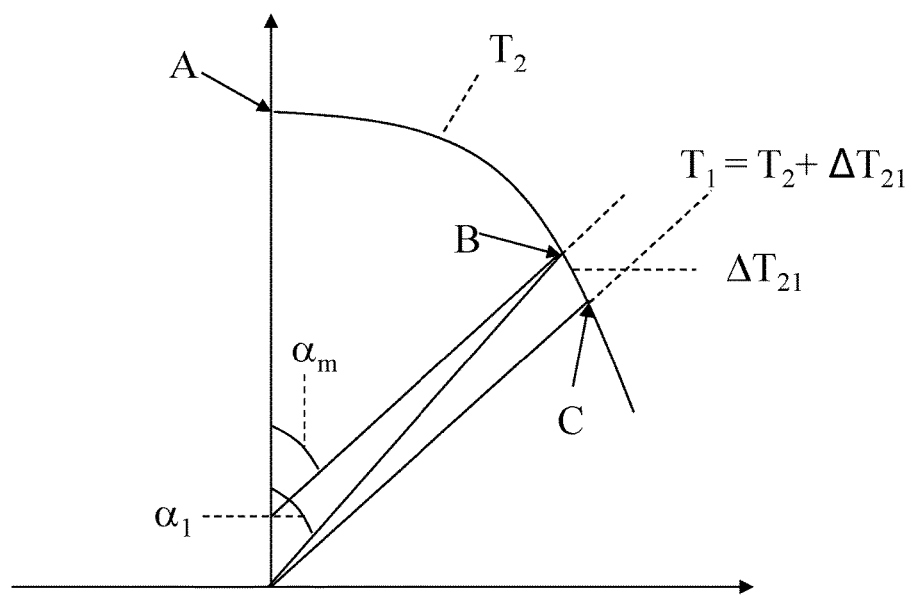
Figure 34:
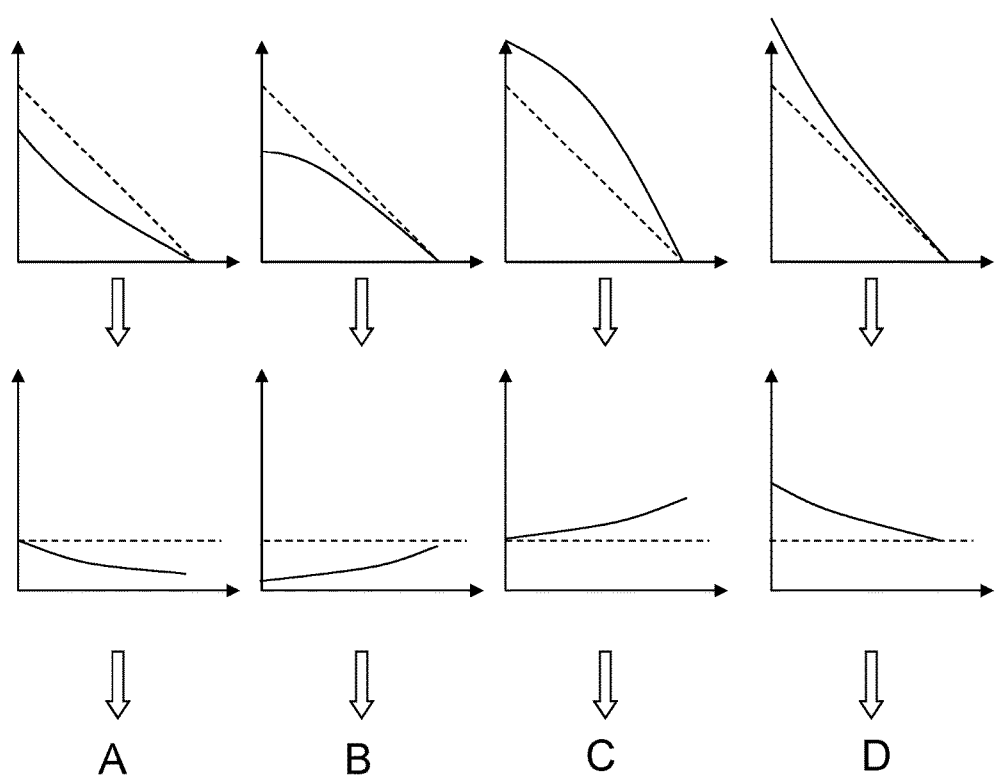

For better understanding of the Actions described above in connection with FIG. 31, a more detailed discussion will follow, with reference to FIGS. 32-34.

Shape-from-X is a common issue in image processing. One example is Shape-from-shading where the surface is assumed to have a uniform reflection and the variation in the intensity can be used to obtain the depth information.

FIG. 32 shows four different shapes (upper row) and their corresponding TTI signal over time. In these cases, for simplicity, we use only half of the sensor. The dotted lines in the upper row represent the reference distance, i.e. the distance the point of impact. The dotted lines in the lower row represent the TTI signal if we would have a flat surface at the same distance as the point of impact. The solid lines in the lower part represent the TTI signal from the above surface.

FIG. 33 shows the surface at a certain time. Point C is the rightmost point we can see when we compute the TTI at T1. Point B is the rightmost point at the next TTI computation T2. Point A is the center of the image. ΔT21 is TTI for the segment that is the difference between T1 and T2. The angle αm is the opening of the lens.

We can now describe T1 in terms of T2, the angels, the missing segment, and the time between two samples, Td from (2), as $$T_1 = T_d + T_2 \frac{\alpha_1}{\alpha_m} + \Delta T_{21} \frac{\alpha_m - \alpha_1}{\alpha_m} \qquad (38.)$$

The difference between two TTI can be expressed as $$T_1 - T_2 = T_d + (\Delta T_{21} - T_2) \frac{\alpha_m - \alpha_1}{\alpha_m} \qquad (39.)$$

Thus, the difference between two TTI values is the sampling time plus the difference between the TTI for the difference segment and the second TTI value. This difference is weighted by a factor that corresponds to the field-of-view that the TTI value T2 occupies in the position that corresponds to T1. If we are headed towards a perpendicular plane, ΔT21 and T2 is equal, the difference I, of course, Td.

FIG. 34, showing second derivatives of the TTI, shows the same TTI functions as in FIG. 32 and their corresponding differentiation in (20).

We can examine the output from the differentiation in (20) when we subtract the known value, Td, from the difference.

$$T_1 - T_2 - T_d = (\Delta T_{21} - T_2) \frac{\alpha_m - \alpha_1}{\alpha_m} \qquad (40.)$$

If this difference is negative we have cases A or B in FIG. 34, otherwise we have cases C or D. If we examine the trend of Equation (21), i.e. perform a second derivative, we can distinguish between A and B and between C and D.

We have presented some new algorithms for robot vision using time-to-impact in the Near-Sensor Image Processing concept. First, we have shown that the angle can be computed to the perpendicular plane of the object that the camera is approaching even if we do not know the absolute speed or the distance to the object. We here used the method to divide the field-of-view into a right- and a left field-of-view. The difference in the TTI values for the two sides is sufficient to compute the slope. Next, we showed that can get the absolute distance and the absolute speed using a two camera setting. It is a known fact that a stereo camera system can compute the absolute distance. The interesting part of this algorithm is that it does not need any pixel- or object correlations between the two cameras. To be able to do this computation we require that the object has a non-zero angle to the perpendicular plane. In e.g. an autonomous robot vision application it is possible to turn the camera slightly to the left or the right in order to obtain a depth.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method to compute impact time between an image sensing circuitry and an object relatively moving at least partially towards, or away from, the image sensing circuitry, wherein the method comprises:

receiving image data associated with a respective image frame of a sequence (1 . . . N) of image frames sensed by said image sensing circuitry and which image frames are imaging said object, identifying multiple pixel positions that are present within each of the image frames, computing, for each one (i) of the multiple pixel positions, a respective duration value (f(i)) indicative of a count of a number of consecutive frames during which the pixel position (i) is identified as being a local extreme point in said sequence (1 ... N) of image frames, wherein the pixel position (i) is identified as being a local extreme point when an image data value of the pixel position (i) is identified as being either a maxima value or a minima value in relation to image data values of those pixel positions that are adjacent to said pixel position (i), and computing a slope value (k) by fitting a line to the duration values (f(i)) as a function of the multiple pixel positions, whereby the slope value (k) corresponds to the slope of the line.

2. The method as claimed in claim 1, wherein the duration value is a largest number of consecutively occurring local extreme points in said sequence of image frames.

3. The method as claimed in any one of claims 1-2, further comprising computing a sum ($\Sigma f(i)$) of the duration values (f(i)).

4. A method to compute impact time between an image sensing circuitry and an object relatively moving at least partially towards, or away from, the image sensing circuitry, wherein the method comprises:

receiving image data associated with a respective image frame of a sequence (1 ... N) of image frames sensed by said image sensing circuitry and which image frames are imaging said object, identifying multiple pixel positions that are present within each of the image frames, computing, for each one (i) of the multiple pixel positions, a respective duration value (f(i)) indicative of a count of a number of consecutive frames during which the pixel position (i) is identified as being a local extreme point in said sequence (1 ... N) of image frames, wherein the pixel position (i) is identified as being a local extreme point when an image data value of the pixel position (i) is identified as being either a maxima value or a minima value in relation to image data values of those pixel positions that are adjacent to said pixel position (i), and computing a slope value (k) based on an inverse ($1/\Sigma f(i)$) of the sum multiplied with a predetermined constant scale factor (c), wherein said slope value (k) corresponds to:

$$k = \frac{c}{\Sigma f(i)},$$

where c is said predetermined constant scale factor and $\Sigma f(i)$ is said sum of the duration values (f(i)).

5. The method as claimed in claim 4, wherein the predetermined constant scale factor (c) corresponds to:

$$c = \Sigma \frac{1}{|i|},$$

where i is a respective pixel position of said multiple pixel positions.

6. The method as claimed in claim 4, further comprising: computing an offset value ($\delta$) indicative of an offset of a pixel position ($i_{max}$) of a maximum duration value amongst the computed largest duration values (f(i)) in relation to a centre image position ($i_{centre}$) of said multiple pixel positions, wherein the scale factor (c) corresponds to:

$$c = \Sigma \frac{1}{|(i-\delta)|},$$

where i is a respective image position of said multiple pixel positions and $\delta$ is said offset value.

7. The method as claimed in claim 1, further comprising: computing the impact time using the computed slope value (k), wherein the impact time ($T_I$) corresponds to:

$$T_I = T\frac{1+k}{k},$$

where k is the computed slope value and T is the sample period of the image frames.

8. The method as claimed in claim 1, wherein the multiple pixel positions corresponds to a subset of all pixel positions.

9. The method as claimed in claim 1, wherein the multiple pixel positions are uniformly distributed amongst all pixels positions, or at least all pixel positions in an area of interest.

10. The method as claimed in claim 1, wherein each one of said multiple pixel positions is associated with a respective pixel position.

11. A non-transitory computer readable medium having a program recorded thereon that, when executed by a computer, causes the computer to perform operations to compute impact time between an image sensing circuitry and an object relatively moving at least partially towards, or away from, the image sensing circuitry, wherein the operations comprise:

receiving image data associated with a respective image frame of a sequence (1 ... N) of image frames sensed by said image sensing circuitry and which image frames are imaging said object, identifying multiple pixel positions that are present within each of the image frames, computing, for each one (i) of the multiple pixel positions, a respective duration value (f(i)) indicative of a count of a number of consecutive frames during which the pixel position (i) is identified as being a local extreme point in said sequence (1 ... N) of image frames, wherein the pixel position (i) is identified as being a local extreme point when an image data value of the pixel position (i) is identified as being either a maxima value or a minima value in relation to image data values of those pixel positions that are adjacent to said pixel position (i), and computing a slope value (k) by fitting a line to the duration values (f(i)) as a function of the multiple pixel positions, whereby the slope value (k) corresponds to the slope of the line.

12. A computer configured to perform operations to compute impact time between an image sensing circuitry and an object relatively moving at least partially towards, or away from, the image sensing circuitry, wherein the operations comprise:

receiving image data associated with a respective image frame of a sequence (1 ... N) of image frames sensed by said image sensing circuitry and which image frames are imaging said object, identifying multiple pixel positions that are present within each of the image frames, computing, for each one (i) of the multiple pixel positions, a respective duration value (f(i)) indicative of a count of a number of consecutive frames during which the pixel position (i) is identified as being a local extreme point in said sequence (1 ... N) of image frames, wherein the pixel position (i) is identified as being a local extreme point when an image data value of the pixel position (i) is identified as being either a maxima value or a minima value in relation to image data values of those pixel positions that are adjacent to said pixel position (i), and computing a slope value (k) based on an inverse (1/Σf(i)) of the sum multiplied with a predetermined constant scale factor (c), wherein said slope value (k) corresponds to:

$$k = \frac{c}{\sum f(i)},$$

where c is said predetermined constant scale factor and Σf(i) is said sum of the duration values (f(i)).

13. An apparatus to compute impact time between an image sensing circuitry and an object relatively moving at least partially towards, or away from, the image sensing circuitry, wherein the apparatus comprises:

a receiving port, configured to image data associated with a respective image frame of a sequence (1 ... N) of image frames sensed by said image sensing circuitry and which image frames are imaging said object, and a first computing circuitry, configured to:
identify multiple pixel positions that are present within each of the image frames, and
compute, for each one (i) of the multiple pixel positions, a respective duration value (f(i)) indicative of a count of a number of consecutive frames during which the pixel position (i) is identified as being a local extreme point said sequence (1 ... N) of image frames, wherein the pixel position (i) is identified as being a local extreme point when an image data value of the pixel position (i) is identified as being either a maxima value or a minima value in relation to image data values of those pixel positions that are adjacent to said pixel position (i); and a second computing circuitry, configured to compute a slope value (k) by fitting a line to the duration values (f(i)) as a function of the multiple pixel positions, whereby the slope value (k) corresponds to the slope of the line.

14. The apparatus as claimed in claim 13, wherein the duration value is a largest number of consecutively occurring local extreme points in said sequence of image frames.

15. The apparatus as claimed in claim 13, further comprising:

a third computing circuitry, configured to compute a slope value (k) based on an inverse (1/Σf(i)) of the sum multiplied with a predetermined constant scale factor (c), wherein said slope value (k) corresponds to:

$$k = \frac{c}{\sum f(i)},$$

where c is said predetermined constant scale factor and Σf(i) is said sum of the duration values (f(i)).

16. The apparatus as claimed in claim 15, wherein the predetermined constant scale factor (c) corresponds to:

$$c = \sum \frac{1}{|i|},$$

where i is a respective pixel position of said multiple pixel positions.

17. The apparatus as claimed in claim 15, further comprising:

a fourth computing circuitry configured to compute an offset value (δ) indicative of an offset of a pixel position ($i_{max}$) of a maximum duration value amongst the computed largest duration values (f(i)) in relation to a centre image position ($i_{centre}$) of said multiple pixel positions, wherein the predetermined constant scale factor (c) corresponds to:

$$c = \sum \frac{1}{|(i - \delta)|},$$

where i is a respective image position of said multiple pixel positions and δ is said offset value.

18. The apparatus as claimed in claim 15, further comprising:

a fifth computing circuitry, configured to compute the impact time using the computed slope value (k), wherein the impact time ($T_I$) corresponds to:

$$T_I = T\frac{1+k}{k},$$

where k is the computed slope value and T is the sample period of the image frames.

19. The apparatus as claimed in claim 15, wherein the multiple pixel positions corresponds to a subset of all pixel positions.

20. The apparatus as claimed in claim 13, wherein the multiple pixel positions are uniformly distributed amongst all pixels positions, or at least all pixel positions in an area of interest.

21. The apparatus as claimed in claim 13, wherein each one of said multiple pixel positions is associated with a respective pixel position.

22. The apparatus as claimed in claim 13, further comprising:

the image sensing circuitry configured to sense the image frames of the sequence.

23. The apparatus as claimed in claim 22, wherein:

the image sensing circuitry comprises sensing elements, each one being associated with a pixel position and configured to capture light, wherein each sensing element is further configured to, in response to captured light, provide local image data corresponding to a pixel, and the first computing circuitry comprises computing elements, each computing element being associated with one of or a group of the sensing elements and thereby also corresponding pixel position/s, wherein a computing element that is associated with a pixel position/s that corresponds to one of the multiple pixel positions, is configured to compute the respective duration value (f(i)) based on local image data from the associated sensing element/s.

* * * * *

UNITED STATES PATENT AND TRADEMARK OFFICE
CERTIFICATE OF CORRECTION

| | | |
|---|---|---|
| PATENT NO. | : 10,078,904 B2 | Page 1 of 1 |
| APPLICATION NO. | : 14/373306 | |
| DATED | : September 18, 2018 | |
| INVENTOR(S) | : Robert Forchheimer and Anders Aström | |

It is certified that error appears in the above-identified patent and that said Letters Patent is hereby corrected as shown below:

In the Claims

Column 27, Line 41, Claim 13, after "point", please insert -- in --.

Signed and Sealed this
Thirteenth Day of August, 2024

Katherine Kelly Vidal
*Director of the United States Patent and Trademark Office*